(12) United States Patent
Twitchell, Jr.

(10) Patent No.: US 8,144,671 B2
(45) Date of Patent: Mar. 27, 2012

(54) COMMUNICATING VIA NONDETERMINISTIC AND DETERMINISTIC NETWORK ROUTING

(76) Inventor: Robert W. Twitchell, Jr., Cumming, GA (US)

( * ) Notice: Subject to any disclaimer, the term of this patent is extended or adjusted under 35 U.S.C. 154(b) by 1504 days.

(21) Appl. No.: 11/428,535

(22) Filed: Jul. 3, 2006

(65) Prior Publication Data

US 2007/0002792 A1   Jan. 4, 2007

Related U.S. Application Data

(60) Provisional application No. 60/696,159, filed on Jul. 1, 2005.

(51) Int. Cl.
*H04Q 7/24* (2006.01)

(52) U.S. Cl. .......... 370/338; 370/236; 370/47; 370/344; 370/247; 370/241; 370/480; 370/380; 370/255; 370/389; 370/386; 709/227; 709/238

(58) Field of Classification Search .................. 370/236, 370/447, 344, 247, 241, 480, 338, 255, 389, 370/386, 328, 356; 455/522, 10, 21, 343.1, 455/574, 456.1; 709/227, 238, 29
See application file for complete search history.

(56) References Cited

U.S. PATENT DOCUMENTS

| | | | |
|---|---|---|---|
| 3,805,265 A | 4/1974 | Lester | |
| 4,165,024 A | 8/1979 | Oswalt et al. | |
| 4,613,990 A | 9/1986 | Halpern | |
| 4,680,583 A | 7/1987 | Grover | |
| 4,688,244 A | 8/1987 | Hannon et al. | |
| 4,750,197 A | 6/1988 | Denekamp et al. | |
| 4,817,537 A | 4/1989 | Cripe et al. | |
| 5,040,238 A | 8/1991 | Comroe et al. | |
| 5,054,052 A | 10/1991 | Nonami | |
| 5,117,501 A | 5/1992 | Childress et al. | |
| 5,129,096 A | 7/1992 | Burns | |
| 5,210,540 A | 5/1993 | Masumoto | |

(Continued)

FOREIGN PATENT DOCUMENTS

EP            0467036 A2       1/1992

(Continued)

OTHER PUBLICATIONS

Gary Morgan, Miniature Tags Provide Visibility & Cohesion for an LIA Battalion Level 'Proof of Principle', Pacific NW National Laboratory, Apr. 2001, Gary.morgan@pnl.gov.

(Continued)

*Primary Examiner* — Rafael Pérez-Gutiérrez
*Assistant Examiner* — Joseph Arévalo
(74) *Attorney, Agent, or Firm* — Tillman Wright, PLLC; Chad D. Tillman; Jeremy C. Doerre

(57) ABSTRACT

In a wireless network that includes a plurality of nodes, a method of communicating a message from an originating node, intended for receipt by a destination node, via one or more intermediate nodes, includes the steps of: (a) communicating with just a single node within the communications range of the originating node—including sending the message and the known network pathway—if a network pathway to the destination node is known by the originating node, the single node being the first intermediate node identified in the known network pathway; and (b) communicating with one or more first intermediate nodes within the communications range of the originating node—including sending the message—if a network pathway to the destination node is unknown by the originating node.

9 Claims, 30 Drawing Sheets

U.S. PATENT DOCUMENTS

| | | |
|---|---|---|
| 5,265,025 A | 11/1993 | Hirata |
| 5,295,154 A | 3/1994 | Meier et al. |
| 5,331,637 A | 7/1994 | Francis et al. |
| 5,369,784 A | 11/1994 | Nelson |
| 5,400,254 A | 3/1995 | Fujita |
| 5,425,051 A | 6/1995 | Mahany |
| 5,442,758 A | 8/1995 | Slingwine et al. |
| 5,511,232 A | 4/1996 | O'Dea et al. |
| 5,565,858 A | 10/1996 | Guthrie |
| 5,579,306 A | 11/1996 | Dent |
| 5,590,409 A | 12/1996 | Sawahashi et al. |
| 5,596,652 A | 1/1997 | Piatek et al. |
| 5,604,892 A | 2/1997 | Nuttall et al. |
| 5,606,313 A | 2/1997 | Allen et al. |
| 5,640,151 A | 6/1997 | Reis et al. |
| 5,652,751 A | 7/1997 | Sharony |
| 5,682,379 A | 10/1997 | Mahany et al. |
| 5,686,902 A | 11/1997 | Reis et al. |
| 5,732,077 A | 3/1998 | Whitehead |
| 5,761,195 A | 6/1998 | Lu et al. |
| 5,790,946 A | 8/1998 | Rotzoll |
| 5,793,882 A | 8/1998 | Piatek et al. |
| 5,833,910 A | 11/1998 | Teixido |
| 5,862,803 A | 1/1999 | Besson |
| 5,890,054 A | 3/1999 | Logsdon et al. |
| 5,892,441 A | 4/1999 | Woolley et al. |
| 5,907,491 A | 5/1999 | Canada et al. |
| 5,917,423 A | 6/1999 | Duvall |
| 5,939,982 A | 8/1999 | Gagnon et al. |
| 5,943,610 A | 8/1999 | Endo |
| 5,950,124 A | 9/1999 | Trompower et al. |
| 5,974,236 A | 10/1999 | Sherman |
| 5,977,913 A | 11/1999 | Christ |
| 6,005,884 A | 12/1999 | Cook et al. |
| 6,006,100 A | 12/1999 | Koenck et al. |
| 6,072,784 A | 6/2000 | Agrawal et al. |
| 6,078,789 A | 6/2000 | Bodenmann et al. |
| 6,091,724 A | 7/2000 | Chandra et al. |
| 6,097,707 A | 8/2000 | Hodzic et al. |
| 6,104,512 A | 8/2000 | Batey, Jr. et al. |
| 6,118,988 A | 9/2000 | Choi |
| 6,125,306 A | 9/2000 | Shimada et al. |
| 6,127,928 A | 10/2000 | Issacman |
| 6,127,976 A | 10/2000 | Boyd et al. |
| 6,134,587 A | 10/2000 | Okanoue |
| 6,134,589 A * | 10/2000 | Hultgren .................... 709/227 |
| 6,192,400 B1 | 2/2001 | Hanson et al. |
| 6,198,913 B1 | 3/2001 | Sung et al. |
| 6,201,974 B1 | 3/2001 | Lietsalmi et al. |
| 6,256,303 B1 | 7/2001 | Drakoulis et al. |
| 6,313,745 B1 | 11/2001 | Suzuki |
| 6,354,493 B1 | 3/2002 | Mon |
| 6,360,169 B1 | 3/2002 | Dudaney |
| 6,381,467 B1 | 4/2002 | Hill et al. |
| 6,404,082 B1 | 6/2002 | Rasinski et al. |
| 6,405,102 B1 | 6/2002 | Swartz et al. |
| 6,409,082 B1 | 6/2002 | Davis et al. |
| 6,418,299 B1 | 7/2002 | Ramanathan |
| 6,424,260 B2 | 7/2002 | Maloney |
| 6,424,264 B1 | 7/2002 | Giraldin et al. |
| 6,427,913 B1 | 8/2002 | Maloney |
| 6,437,692 B1 | 8/2002 | Petite |
| 6,473,607 B1 | 10/2002 | Shohara et al. |
| 6,476,708 B1 | 11/2002 | Johnson |
| 6,512,478 B1 | 1/2003 | Chien |
| 6,529,142 B2 | 3/2003 | Yeh et al. |
| 6,542,114 B1 | 4/2003 | Eagleson et al. |
| 6,547,137 B1 | 4/2003 | Begelfer et al. |
| 6,559,620 B2 | 5/2003 | Zhou et al. |
| 6,587,755 B1 | 7/2003 | Smith et al. |
| 6,600,418 B2 | 7/2003 | Francis et al. |
| 6,611,556 B1 | 8/2003 | Koerner et al. |
| 6,614,349 B1 | 9/2003 | Proctor et al. |
| 6,617,962 B1 | 9/2003 | Horwitz et al. |
| 6,665,585 B2 | 12/2003 | Kawase |
| 6,700,533 B1 | 3/2004 | Werb et al. |
| 6,720,888 B2 | 4/2004 | Eagleson et al. |
| 6,737,974 B2 | 5/2004 | Dickinson |
| 6,744,740 B2 * | 6/2004 | Chen ............................ 370/255 |
| 6,745,027 B2 | 6/2004 | Twitchell, Jr. |
| 6,747,562 B2 | 6/2004 | Giraldin et al. |
| 6,753,775 B2 | 6/2004 | Auerbach et al. |
| 6,760,578 B2 | 7/2004 | Rotzoll |
| 6,761,312 B2 | 7/2004 | Piatek et al. |
| 6,765,484 B2 | 7/2004 | Eagleson et al. |
| 6,816,063 B2 | 11/2004 | Kubler et al. |
| 6,847,892 B2 | 1/2005 | Zhou et al. |
| 6,919,803 B2 | 7/2005 | Breed |
| 6,927,688 B2 | 8/2005 | Tice |
| 6,934,540 B2 | 8/2005 | Twitchell, Jr. |
| 6,940,392 B2 | 9/2005 | Chan et al. |
| 6,975,614 B2 | 12/2005 | Kennedy |
| 7,012,529 B2 | 3/2006 | Sajkowsky |
| 7,027,773 B1 | 4/2006 | McMillin |
| 7,088,229 B2 | 8/2006 | Johnson |
| 7,098,784 B2 | 8/2006 | Easley et al. |
| 7,103,344 B2 | 9/2006 | Menard |
| 7,126,470 B2 | 10/2006 | Clift et al. |
| 7,133,704 B2 | 11/2006 | Twitchell, Jr. |
| 7,142,121 B2 | 11/2006 | Chan et al. |
| 7,155,264 B2 | 12/2006 | Twitchell, Jr. |
| 7,191,934 B2 | 3/2007 | Miller et al. |
| 7,196,622 B2 | 3/2007 | Lambright et al. |
| 7,200,132 B2 | 4/2007 | Twitchell, Jr. |
| 7,209,468 B2 | 4/2007 | Twitchell, Jr. |
| 7,209,771 B2 | 4/2007 | Twitchell, Jr. |
| 7,212,122 B2 | 5/2007 | Gloekler et al. |
| 7,221,668 B2 | 5/2007 | Twitchell, Jr. |
| 7,230,933 B2 | 6/2007 | Bahl et al. |
| 7,282,944 B2 | 10/2007 | Gunn et al. |
| 7,348,875 B2 | 3/2008 | Hughes et al. |
| 7,349,803 B2 | 3/2008 | Belenkii et al. |
| 7,349,804 B2 | 3/2008 | Belenkii et al. |
| 7,376,507 B1 | 5/2008 | Daily et al. |
| 7,440,781 B2 | 10/2008 | Beach et al. |
| 7,940,716 B2 | 5/2011 | Twitchell |
| 2001/0000019 A1 | 3/2001 | Bowers et al. |
| 2001/0050550 A1 | 12/2001 | Yoshida et al. |
| 2002/0039896 A1 | 4/2002 | Brown |
| 2002/0050932 A1 | 5/2002 | Rhoades et al. |
| 2002/0089434 A1 | 7/2002 | Ghazarian |
| 2002/0098861 A1 | 7/2002 | Doney et al. |
| 2002/0119770 A1 | 8/2002 | Twitchell, Jr. |
| 2002/0146985 A1 | 10/2002 | Naden |
| 2003/0008692 A1 | 1/2003 | Phelan |
| 2003/0037167 A1 | 2/2003 | Garcia-Luna-Aceves et al. |
| 2003/0045295 A1 | 3/2003 | Stanforth |
| 2003/0083064 A1 | 5/2003 | Cooper |
| 2003/0117966 A1 * | 6/2003 | Chen ............................ 370/255 |
| 2003/0141973 A1 | 7/2003 | Yeh et al. |
| 2003/0144020 A1 | 7/2003 | Challa et al. |
| 2003/0179073 A1 | 9/2003 | Ghazarian |
| 2003/0182077 A1 | 9/2003 | Emord |
| 2003/0209601 A1 | 11/2003 | Chung |
| 2003/0236077 A1 | 12/2003 | Sivard |
| 2004/0021572 A1 | 2/2004 | Schoen et al. |
| 2004/0025018 A1 * | 2/2004 | Haas et al. .................... 713/168 |
| 2004/0041731 A1 | 3/2004 | Hisano |
| 2004/0082296 A1 | 4/2004 | Twitchell, Jr. |
| 2004/0100394 A1 | 5/2004 | Hitt |
| 2004/0100415 A1 | 5/2004 | Veitch et al. |
| 2004/0119588 A1 | 6/2004 | Marks |
| 2004/0121793 A1 | 6/2004 | Weigele et al. |
| 2004/0135691 A1 | 7/2004 | Duron et al. |
| 2004/0142716 A1 * | 7/2004 | Orlik et al. .................... 455/522 |
| 2004/0147267 A1 | 7/2004 | Hill et al. |
| 2004/0183673 A1 | 9/2004 | Nageli |
| 2004/0198467 A1 * | 10/2004 | Orlik et al. .................... 455/574 |
| 2004/0232924 A1 | 11/2004 | Hilleary et al. |
| 2004/0233041 A1 | 11/2004 | Bohman et al. |
| 2004/0233054 A1 | 11/2004 | Neff et al. |
| 2004/0233855 A1 | 11/2004 | Gutierrez et al. |
| 2004/0246463 A1 | 12/2004 | Milinusic |
| 2004/0246903 A1 * | 12/2004 | Huang et al. .................. 370/247 |
| 2005/0043068 A1 | 2/2005 | Shohara et al. |
| 2005/0073406 A1 | 4/2005 | Easley et al. |
| 2005/0078672 A1 * | 4/2005 | Caliskan et al. .............. 370/389 |

| | | | |
|---|---|---|---|
| 2005/0087235 | A1 | 4/2005 | Skorpik |
| 2005/0088299 | A1 | 4/2005 | Bandy et al. |
| 2005/0090211 | A1 | 4/2005 | Lilja et al. |
| 2005/0093702 | A1 | 5/2005 | Twitchell, Jr. |
| 2005/0093703 | A1 | 5/2005 | Twitchell, Jr. |
| 2005/0111428 | A1* | 5/2005 | Orlik et al. .................. 370/344 |
| 2005/0128080 | A1 | 6/2005 | Hall et al. |
| 2005/0145018 | A1 | 7/2005 | Sabata et al. |
| 2005/0146445 | A1 | 7/2005 | Sleboda et al. |
| 2005/0152318 | A1* | 7/2005 | Elbatt et al. .................. 370/338 |
| 2005/0190759 | A1 | 9/2005 | Lee et al. |
| 2005/0199716 | A1 | 9/2005 | Shafer et al. |
| 2005/0215280 | A1 | 9/2005 | Twitchell, Jr |
| 2005/0226201 | A1 | 10/2005 | McMillin |
| 2005/0261037 | A1 | 11/2005 | Raghunath et al. |
| 2005/0270160 | A1 | 12/2005 | Chan et al. |
| 2006/0109106 | A1 | 5/2006 | Braun |
| 2006/0114102 | A1 | 6/2006 | Chang et al. |
| 2006/0133408 | A1* | 6/2006 | Nogueira-Nine et al. .... 370/447 |
| 2006/0135145 | A1 | 6/2006 | Redi |
| 2006/0146717 | A1 | 7/2006 | Conner et al. |
| 2006/0163422 | A1 | 7/2006 | Krikorian et al. |
| 2006/0164232 | A1 | 7/2006 | Waterhouse et al. |
| 2006/0164239 | A1 | 7/2006 | Loda |
| 2006/0268727 | A1 | 11/2006 | Rangarajan et al. |
| 2006/0270382 | A1 | 11/2006 | Lappetelainen et al. |
| 2006/0286988 | A1* | 12/2006 | Blume et al. ............... 455/456.1 |
| 2007/0002793 | A1 | 1/2007 | Twitchell |
| 2007/0008408 | A1 | 1/2007 | Zehavi |
| 2007/0032951 | A1 | 2/2007 | Tanenhaus et al. |
| 2007/0041345 | A1 | 2/2007 | Yarvis et al. |
| 2007/0115827 | A1* | 5/2007 | Boehnke et al. .............. 370/236 |
| 2007/0135179 | A1 | 6/2007 | Hardman et al. |
| 2007/0147255 | A1 | 6/2007 | Oyman |
| 2007/0189191 | A1 | 8/2007 | Ades |
| 2007/0274232 | A1* | 11/2007 | Axelsson et al. ............. 370/254 |
| 2008/0186984 | A1 | 8/2008 | Nakano |
| 2009/0092082 | A1 | 4/2009 | Twitchell |
| 2009/0154345 | A1 | 6/2009 | Schollmeier et al. |
| 2010/0014444 | A1 | 1/2010 | Ghanadan et al. |

FOREIGN PATENT DOCUMENTS

| | | |
|---|---|---|
| EP | 0748083 | 12/1996 |
| EP | 0748085 | 12/1996 |
| EP | 0829995 | 3/1998 |
| EP | 1317733 A2 | 6/2003 |
| EP | 1692599 A2 | 8/2006 |
| EP | 1692668 A2 | 8/2006 |
| GB | 2308947 | 7/1997 |
| KR | 2005-0102419 | 10/2005 |
| KR | 2007-0005515 A2 | 1/2007 |
| WO | WO0068907 | 11/2000 |
| WO | WO0069186 | 11/2000 |
| WO | 03098175 | 11/2003 |

OTHER PUBLICATIONS

Ben Sommer et al., Group 4, Passive RF Tags.

Kevin Sharp, Physical Reality: A Second Look, Supply Chain Systems, http://www.idsystems.com/reader/1999_03/phys0399_pt2/index.htm, Mar. 1999, Helmers Publishing, Inc.

U.S. Appl. No. 60/444,029, of Nageli, filed Jan. 31, 2003.

Ram Ramanathan et al., Hierarchically-Organized, Multihop Mobile Wireless Networks for Quality-of-Service Support, pp. 1-35, 1998.

Guangyu Pei et al., Mobility Management in Hierarchical Multi-hop Mobile Wireless Networks, 6 pages, 1999.

http://www.iprg/nokia.com/charliep/txt/manet/term.txt, Mobile Ad Hoc Networking Terminology, C. Perkins, Nov. 17, 1998, visited Nov. 13, 2000.

Daniel Lihui Gu et al., C-ICAMA, A Centralized Intelligent Channel Assigned Multiple Access for Multi-Layer Ad-Hoc Wireless Networks with UAVs, 6 pages, 2000.

Atsushi Iwata, et al., Scalable Routing Strategies for Ad Hoc Wireless Networks, IEEE Journal on Selected Areas in Communications, vol. 17, No. 8, Aug. 1999, pp. 1369-1379.

http://www.cs.ucla.edu/NRL/wireless/PAPER/draft-ietf-manet-admrp-02.txt, Sung-Ju Lee et al., On-Demand Multicast Routing Protocol (ODMRP) for Ad Hoc Networks, Jan. 2000, visited Nov. 13, 2000.

Guangyu Pei, et al., A Wireless Hierarchical Routing Protocol with Group Mobility, 1998 IEEE, 5 pages.

Charles E. Perkins, Ad Hoc Networks, Jan. 2001, table of contents, chapters 1, 4, and 11.

J.J. Gardia-Luna-Aceves et al., Source-Tree Routing in Wireless Networks, 1999, 10 pages.

Jean-Pierre Hubaux et al., Toward Self-Organized Mobile Ad Hoc Networks:The Terminodes Project, IEEE Communications Magazine, Jan. 2001, pp. 118-124.

Jaap Haartsen et al., Bluetooth: Vision, Goals, and Architecture, Mobile Computing & Communications Review, vol. 1, No. 2, 1998, 8 pages.

Jaap Haartsen, Bluetooth—The Universal Radio Interface for Ad Hoc, Wireless Connectivity, Ericsson Review No. 3, pp. 110-117, 1998.

Ezio Valdevit, Cascading in Fibre Channel: How to Build a Multi-Switch Fabric, pp. 1-12.

Daniel Lihui Gu et al., Hierarchical Routing for Multi-Layer Ad-Hoc Wireless Networks with UAV's, 5 pages, 2000.

U.S. Appl. No. 60/499,338, of Easley et al., filed Sep. 3, 2003.

Keshavarzian et al., Energy-Efficient Link Assessment in Wireless Sensor Networks, INFOCOM 2004. 23rd Annual Joint Conference of the IEEE Computer and Communications Societies, vol. 3, 2004, pp. 1751-1761.

Stojmenovic et al., Design Giudelines for Routing Protocols in Ad Hoc and Sensor Networks with a Realistic Physical Layer, Communications Magazine, IEEE, vol. 43, Issue 3, Mar. 2005, pp. 101-106.

Melodia et al., On the Interdependence of Distributed Topology Control and Geographical Routing in Ad Hoc and Sensor Networks, Selected Areas in Communications, IEEE Journal, vol. 23, Issue 3, Mar. 2005, pp. 520-532.

"Scalable Routing Strategies for Ad hoc Wireless Networks", Atsushi Iwata et al., IEEE Journal on Selected Areas in Communications, Special Issue on Adhoc Networks, Aug. 1999, pp. 1369-1379.

"Cluster Based Routing Protocol", Internet-Draft Mingliang, Jiang et al., National University of Singapore, Jul. 1999.

Information Disclosure Statement (IDS) Letter Regarding Common Patent Application(s), dated Sep. 23, 2011.

"Written Opinion of the International Search Authority" (Korean Intellectual Property Office) in Terahop Networks Incorporated et al., International Patent Application Serial No. PCT/US06/26158, dated Nov. 21, 2006, 7 pages.

* cited by examiner

14

| $X_1$ | $X_2$ | $X_3$ |
| --- | --- | --- |
| G | $X_4$ | |
| $X_5$ | $X_6$ | $X_7$ |

RANGE $X_4$ = {$X_2$, G, $X_6$}

RANGE $X_5$ = {G, $X_6$}

$t = t_4$

RANGE $X_2$ = {$X_1, X_3, X_4$} t = t₅

RANGE $X_1$ = {$X_2$, G}

RANGE $X_3$ = {$X_2$}

TABLE 1: INDIVIDUAL LINK QUALITY

| Link | Link Quality (Percentage Packets Successfully Transmitted/Not Dropped) |
|---|---|
| G-X1 | 90% |
| G-X4 | 90% |
| G-X5 | 30% |
| X1-X2 | 70% |
| X2-X3 | 90% |
| X2-X4 | 90% |
| X4-X6 | 90% |
| X5-X6 | 90% |
| X6-X7 | 30% |

FIG. 9

TABLE 2: PATHWAY & OVERALL LINK QUALITY

| PATHWAY | OVERALL LINK QUALITY |
|---|---|
| //G/X1 | 90% |
| //G/X1/X2 | 63% |
| //G/X1/X2/X3 | 56.7% |
| //G/X1/X2/X4 | 56.7% |
| //G/X1/X2/X4/X6 | 51% |
| //G/X1/X2/X4/X6/X5 | 45.9% |
| //G/X1/X2/X4/X6/X7 | 15.3% |
|  |  |
| //G/X4 | 90% |
| //G/X4/X2 | 81% |
| //G/X4/X2/X1 | 56.7% |
| //G/X4/X2/X3 | 72.9% |
| //G/X4/X6 | 81% |
| //G/X4/X6/X7 | 24.3% |
|  |  |
| //G/X5 | 30% |
| //G/X5/X6 | 27% |
| //G/X5/X6/X4 | 24.3% |
| //G/X5/X6/X4/X2 | 21.9 |
| //G/X5/X6/X4/X2/X1 | 15.3% |
| //G/X5/X6/X4/X2/X3 | 19.7 |
| //G/X5/X6/X7 | 8.1% |

FIG. 10

TABLE 3: INDIVIDUAL LINK QUALITY KNOWN BY SERVER AT $T=T_5$

| Link | Link Quality (Percentage Packets Successfully Transmitted/Not Dropped) |
|---|---|
| G-X1 | 90% |
| G-X4 | 90% |
| G-X5 | 30% |
| X1-X2 | 70% |
| X2-X4 | 90% |
| X4-X6 | 90% |
| X5-X6 | 90% |
| X6-X7 | 30% |

FIG. 11

TABLE 4: PATHWAY & OVERALL LINK QUALITY KNOWN BY SERVER AT T=$T_5$

| PATHWAY | OVERALL LINK QUALITY |
| --- | --- |
| //G/X1 | 90% |
| //G/X1/X2 | 63% |
| //G/X1/X2/X4 | 56.7% |
| //G/X1/X2/X4/X6 | 51% |
| //G/X1/X2/X4/X6/X5 | 45.9% |
| //G/X1/X2/X4/X6/X7 | 15.3% |
|  |  |
| //G/X4 | 90% |
| //G/X4/X2 | 81% |
| //G/X4/X2/X1 | 56.7% |
| //G/X4/X6 | 81% |
| //G/X4/X6/X7 | 24.3% |
|  |  |
| //G/X5 | 30% |
| //G/X5/X6 | 27% |
| //G/X5/X6/X4 | 24.3% |
| //G/X5/X6/X4/X2 | 21.9 |
| //G/X5/X6/X4/X2/X1 | 15.3% |
| //G/X5/X6/X7 | 8.1% |

COMMUNICATING VIA NONDETERMINISTIC AND DETERMINISTIC NETWORK ROUTING

I. CROSS-REFERENCE TO RELATED APPLICATIONS

For purposes of the United States, the present application is a nonprovisional of, and claims priority under 35 U.S.C. §119(e) to, Twitchell U.S. Provisional Patent Application No. 60/696,159 filed Jul. 1, 2005, which provisional patent application is hereby incorporated herein by reference.

II. INCORPORATED REFERENCES

The present application hereby incorporates by reference: Twitchell U.S. Pat. No. 6,934,540 B2 (titled "Network Formation in Asset-Tracking System Based on Asset Class"); Twitchell U.S. Pat. No. 6,745,027 B2 (titled "Class Switched Networks for Tracking Articles"); Twitchell U.S. Patent Application Publication No. 2005/0093703 A1 (titled "Systems and Methods Having LPRF Device Wake Up Using Wireless Tag"); Twitchell U.S. patent application Ser. No. 11/422,321 (titled "Remote Sensor Interface (RSI) Stepped Wake-Up Sequence"), which published as U.S. Patent Application Publication No. 2006/0276161 which publication also is hereby incorporated herein by reference; and Twitchell U.S. patent application Ser. No. 11/423,127 (titled "All Weather Housing Assembly For Electronic Components"), which published as U.S. Patent Application Publication No. 2006/0289204, which publication also is hereby incorporated herein by reference.

Additionally, Appendix A attached hereto is hereby incorporated herein by reference, which Appendix contains the disclosure of incorporated provisional patent application 60/696,159.

III. COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

IV. SUMMARY OF THE INVENTION

The present invention broadly relates to wireless communications utilizing nondeterministic and deterministic networking and, in particular, to wireless communications utilizing nondeterministic and deterministic networking within ad hoc networking environments. Commercial implementations of the present invention are particularly suited for use in asset tracking networks, sensor data acquisition networks, and combinations thereof, including class-based networks. Such class-based networks are disclosed, for example, in U.S. Pat. Nos. 6,934,540 and 6,745,027, which have been incorporated herein by reference above. Commercial implementations of the present invention also may be particularly suited for use in voice and video conferencing communications between persons.

The present invention includes many aspects and features, and certain aspects and features of the present invention relate to a wireless network that includes a plurality of nodes.

In such a wireless network, a first aspect of the invention includes a method of communicating a message from an originating node, intended for receipt by a destination node, via one or more intermediate nodes, includes the step of communicating with all nodes within the communications range of the originating node—including sending the message—if a network pathway to the destination node is unknown by the originating node.

In a feature of this aspect, the method further includes communicating the message from the originating node by a first intermediate node by communicating with all nodes within the communications range of the first intermediate node if a network pathway to the destination node is unknown by the first intermediate node. The step of communicating by the first intermediate node includes sending the message and the link quality between the originating node and the first intermediate node.

In such a wireless network, another aspect of the invention includes a method of communicating a message from an originating node, intended for receipt by a destination node, via one or more intermediate nodes, includes the steps of: (a) communicating with just a single node within the communications range of the originating node if a network pathway to the destination node is known by the originating node, the single node being the first intermediate node identified in the known network pathway, said step of communicating including sending the message and the known network pathway to the first intermediate node; and (b) communicating with one or more first intermediate nodes within the communications range of the originating node if a network pathway to the destination node is unknown by the originating node, said step of communicating including sending the message.

In a feature of this aspect, the method further includes communicating the message by a first intermediate node by: (a) communicating with just a single node within the communications range of the first intermediate node if a network pathway to the destination node is known by the first intermediate node, the single node being the node identified next after the first intermediate node in the known network pathway, including sending, to the next identified node the message, the known network pathway, and the link quality between the originating node and the first intermediate node; and (b) communicating with one or more nodes within the communications range of the first intermediate node if a network pathway to the destination node is unknown by the first intermediate node, including sending the message, and the link quality between the originating node and the first intermediate node.

In another feature of this aspect, the method further includes communicating the message by the first intermediate node by: (a) communicating with just a single node within the communications range of the first intermediate node if a single network pathway to the destination node is known by the first intermediate node, the single node being the node identified next after the first intermediate node in the single network pathway, said step of communicating including sending, to the single node, the message, the known network pathway, and the link quality between the originating node and the first intermediate node; (b) if a plurality of network pathways to the destination node are known by the first intermediate node, then, determining a preferred network pathway from the plurality of known network pathways in accordance with an algorithm, and communicating with just a single node within the communications range of the first intermediate node, the single node being the node identified next after the first intermediate node in the preferred network pathway, including sending, to the next identified node, the message, the preferred network pathway, and the link quality between the originating node and the first intermediate node; and (c) if no network pathway is known by the first intermediate node, then communicating with one or more nodes within the communications range of the first intermediate node, including sending the message and the link quality between the originating node and the first intermediate node. Determining a preferred network pathway from the known network pathways in accordance with an algorithm may include comparing, for each known network pathway, the number of hops, between nodes, that are required to reach the destination node; and/or comparing the overall link quality of the respective known network pathways.

In such a wireless network, another aspect of the invention includes a method of maintaining, by a first node, information regarding communications links between nodes in the wireless network. The method includes the steps of: (a) for each communications link that is established with another node, recording an identification of the other node; and (b) for each message received by the first node from the other node through the communications link with the other node, recording a network pathway by which the message has been sent in the wireless network, the network pathway identifying the nodes and the communications links therebetween in the wireless network by which the message has been sent.

In a feature of this aspect, the method further includes recording, in association with the identification of the other node, data indicative of a link quality between the first node and the other node.

In a feature of this aspect, the method further includes recording, for each message received by the first node from the other node through the communications link with the other node, data indicative of a link quality between each communications link in the network pathway by which the message has been sent.

In a feature of this aspect, the method further includes recording, in association with the identification of the other node, data indicative of class designations of the other node.

In a feature of this aspect, the method further includes recording, for each message received by the first node from the other node through the communications link with the other node, data indicative of class designations of each node in the communications links in the network pathway by which the message has been sent.

In a feature of this aspect, the method further includes recording, for each message received by the first node from the other node through the communications link with the other node, data generally indicative of the time at which the message has been sent via the network pathway.

In a feature of this aspect, the method further includes recording, for each message received by the first node from the other node through the communications link with the other node, a network pathway to a destination node by which the message is being sent if such network pathway to the destination node is identified with the message.

In a feature of this aspect, the method further includes communicating, by the first node, the message to a subsequent node in the wireless network if the message is intended for receipt by a node other than the first node, including the steps of: determining whether one or more network pathways are known by the first node from the first node to the destination node of the message; communicating with just a single node within the communications range of the first node if a single network pathway to the destination node is known by the first node, the single node being the node identified next in the single network pathway after the first node, including sending, to the single node, the message, the single network pathway, and the link quality between the first node and the other node from which the message was received by the first node; and (c) if more than one network pathway to the destination node is known by the first node, then determining a preferred network pathway from the known network pathways in accordance with an algorithm, and communicating with just a single node within the communications range of the first node, the single node being the node identified next in the preferred network pathway after the first node, including sending, to the single node, the message, the preferred network pathway and the link quality between the first node and the other node from which the message was received by the first node; and (d) if no network pathway to the destination node is known by the first node, then communicating with one or more nodes within the communications range of the first node, including sending, the message and the link quality between the first node and the other node from which the message was received by the first node. Determining whether one or more network pathways are known by the first node from the first node to the destination node of the message may include searching the maintained information for a network pathway from the first node to the destination node, and the maintained information that is searched may include any network pathway to the destination node that is identified with the message.

In features of this aspect, determining a preferred network pathway from the known network pathways in accordance with an algorithm includes comparing the general times at which messages were sent via the network pathways; comparing the number of hops between nodes in the known network pathways; and/or comparing the overall link quality of the known network pathways.

In such a wireless network, another aspect of the invention includes a method of maintaining information regarding communications links between nodes in the wireless network includes recording, by a server, for each message that is received by the server from the wireless network, a network pathway by which the message has been sent in the wireless network, the network pathway identifying the nodes and the communications links therebetween in the wireless network by which the message has been sent.

In a feature of this aspect, the method further includes recording, in association with the identification of the nodes and the communications links therebetween in the wireless network by which the message has been sent, data indicative of a link quality for each communications link.

In a feature of this aspect, the method further includes recording, in association with each network pathway by which the message has been sent, data indicative of overall link quality for the network pathway.

In a feature of this aspect, the method further includes recording, in association with each network pathway by which the message has been sent, data generally indicative of the time at which the message was sent via the network pathway.

In a feature of this aspect, the method further includes: (a) determining, based on the maintained information, a network pathway for communicating a message to a destination node of the wireless network, and (b) communicating the message to a gateway node of the wireless network together with the determined network pathway to the destination node.

In a feature of this aspect, the method further includes distributing, to one or more nodes of the wireless network, information regarding communications links based on the information maintained by said server.

In a feature of this aspect, the method further includes distributing, to one or more nodes of the wireless network, information regarding network pathways based on the information maintained by said server.

In additional feature of the foregoing aspects, a message may be communicated between nodes utilizing transmission control protocol (TCP), and messages may be communicated between nodes of the wireless network via data packets.

In addition to the foregoing methods in accordance with aspects the invention, other aspects of the invention relate to wireless networks that utilize such methods and, in particular, such wireless networks that are ad hoc wireless networks. The wireless networks furthermore may comprise class-based wireless network that may be utilized for monitoring and/or tracking assets.

In features of these aspects, a node of the wireless network may be a data communications device and include, for example, a standards based radio such as a Bluetooth radio. The node may further includes a wireless receiver for powering up the standards based radio upon receipt of a broadcast that is intended for the standards based radio. The second wireless receiver further may perform a stepped wake-up sequence of the standards based radio. The standards based radio further may include a sensor interface whereby data is acquired by the data communications device from an associated sensor, and the wireless network may comprise a remote sensor interface (RSI) network.

In addition to the aforementioned aspects and features of the invention, it should be noted that the invention further includes the various possible combinations of such aspects and features, including the combinations of such aspects and features with those aspects and features of the incorporated references from which priority is claimed.

V. BRIEF DESCRIPTION OF THE DRAWINGS

Particular embodiments of the invention are to be understood according to the detailed descriptions that follow in conjunction with the attached figures, wherein:

FIGS. 2-8 illustrate the wireless network of FIG. 1 in which the sequence of node-to-node communications occurs when a message from node $X_7$ is originated and communicated for further communication to the server of FIG. 1.

FIG. 9 illustrates a table of representative link quality for each possible communications link that may be established between each pair of nodes of the wireless network of FIG. 1.

FIG. 10 illustrates a table of representative overall link quality for each possible pathway between a node and the server in the wireless network of FIG. 1, the overall link quality being based on the link quality for each node-to-node communications link set forth in the table of FIG. 9.

FIG. 11 illustrates a table of representative link quality for each communications link established between each pair of nodes of the wireless network of FIG. 1 that is known to the server at time $t=t_5$ based on communication sequences of FIGS. 2-8.

FIG. 12 illustrates a table of overall link quality for each pathway between a node and the server in the wireless network based on the table of link qualities of FIG. 11 that are known to the server.

VI. DETAILED DESCRIPTION

Figure 1:
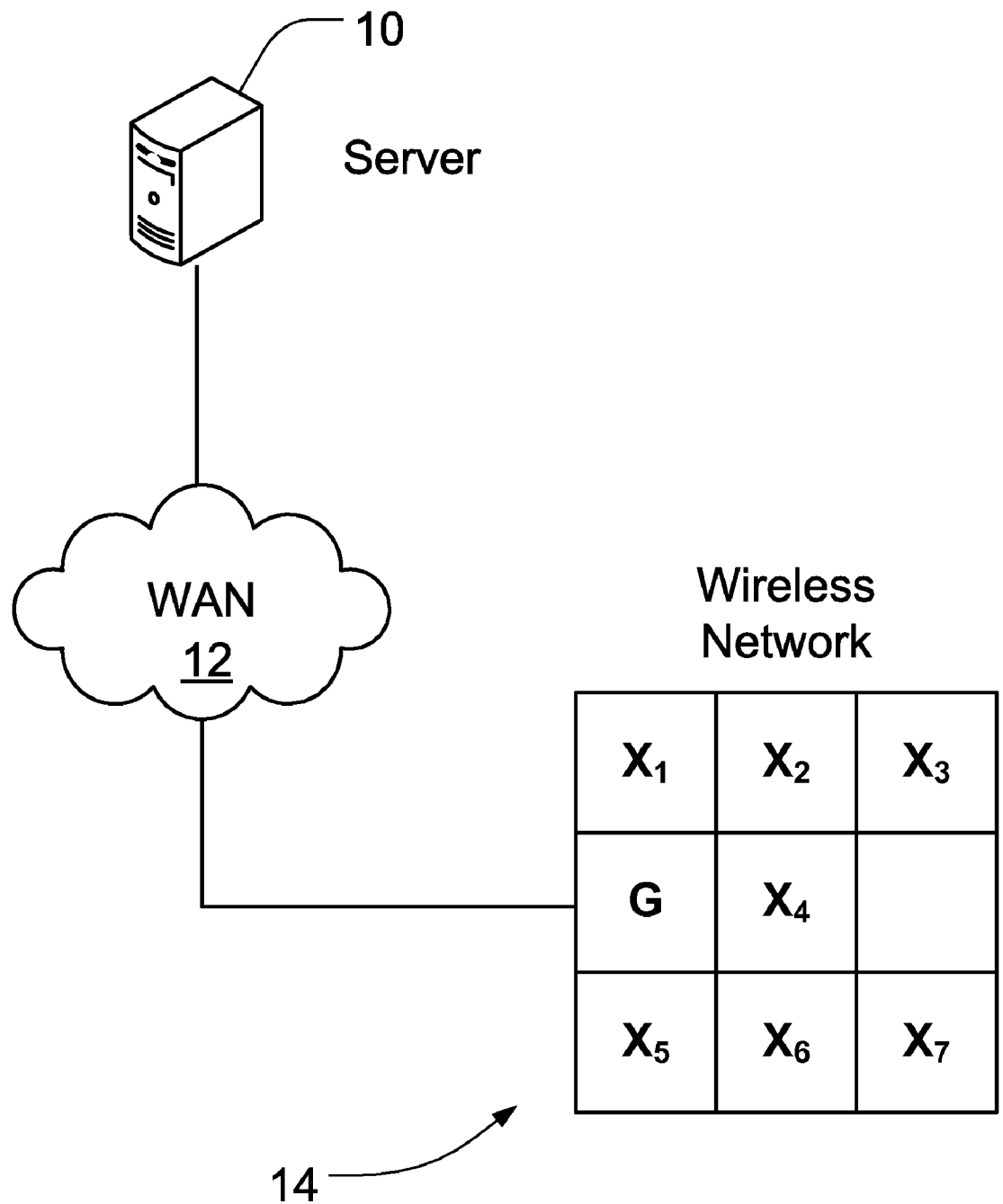
FIG. 1 illustrates an architecture associated with an exemplary embodiment of the invention.

As a preliminary matter, it will readily be understood by one having ordinary skill in the relevant art ("Ordinary Artisan") that the present invention has broad utility and application. Various embodiments are discussed for illustrative purposes in providing a full and enabling disclosure of the present invention. Moreover, many embodiments, such as adaptations, variations, modifications, and equivalent arrangements, will be implicitly disclosed by the descriptions of embodiments herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at lease one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Terminology

In addition to the foregoing, the following terminology also is used herein.

As used herein with reference to a wireless network, a "node" of the wireless network refers to a wireless radio-frequency data communication device comprising a transceiver that receives and transmits information wirelessly with one or more other nodes of the wireless network. Moreover, in preferred embodiments and implementations of the invention, the transceiver comprises a standards-based radio, such as a Bluetooth radio, and information is communicated in data packets using transmission control protocol ("TCP"). A data communication device of a node of the wireless network may be mobile or fixed at a particular location, and the data communication device may include an internal power supply source or utilize an external power supply source. The data communication device also preferably includes an interface for communicating with an associated sensor or other data acquisition device, which sensor may or may not form part of the node. The data communication device constituting the node may be attached to an asset that is to be monitored and/or tracked; alternatively, the data communication device constituting the node may be permanently affixed to a structure for monitoring and/or tracking assets that come within proximity thereto.

Generally, in receiving or transmitting information wirelessly between two nodes of a wireless network, a communications link is established between the two data communication devices of the two nodes. An electronic message then is transmitted via the communications link between the two data communication devices. Following transmission of the electronic message, the communications link is disconnected.

Alternatively, the communications link established between the data communication devices of the two nodes may be maintained, if desired, in order to provide continuous communications between the two nodes without having to reestablish a communications link therebetween. Establishing a continuous communications link between two nodes without having to reestablish the communications link therebetween is particularly desirable, for instance, in transmitting real time audiovisual content, or in providing real time audiovisual communications between persons. Such person-to-person communications further may be "two-way" when each data communication device at each node includes dual radios. This is particularly true when Bluetooth radios are utilized, which do not include duplex capabilities. Thus, for example, maintaining continuous communications between two nodes each employing dual radios is particularly desirable if data packets for Voice-over-IP ("VoIP") services are to be wirelessly transmitted between the two nodes.

A node of a wireless network from which an electronic message first is sent is referred to herein as an "originating node." Similarly, a node of a wireless network to which an electronic message is ultimately destined is referred to herein as a "destination node." Any node that relays the electronic message from the originating node to the destination node is referred to herein as an "intermediate node." Each route by which an electronic message is communicated from an originating node to a destination node is referred to herein as a "pathway," and each pathway is identified by the identification of the originating node, each intermediate node that relays the electronic message, and the destination node.

In accordance with the invention, one or more nodes of a wireless network preferably are disposed in direct electronic communication with a network that is external to the wireless network. Such a node is referred to herein as a "gateway." Communications between the gateway and the external network may be wireless or hard wired and comprise, for example, a network interface card that accepts a CAT 5 cable for Ethernet communications; a cellular transceiver for communications via a cellular telephone network; a satellite transceiver for communications via a satellite network; or any combination thereof. The wired network itself may be a wide area network ("WAN") and include the Internet.

A computer system preferably is disposed in electronic communication with the same wired network, whereby the computer system and each node of the wireless network may communicate with each other through the external network, such as the WAN, and the one or more gateways. Generally, the computer system preferably includes application software and a database (or access to a database), and the computer system records and maintains information regarding the wireless network, nodes thereof, and/or data received therefrom. Such a computer system is referred to herein as a "server."

A node of the wireless network at which a data communication device establishes a communications link with a gateway is referred to herein as a "top level node."

As further used herein with reference to a wireless network, an "ad hoc network" refers to a wireless network in which node-to-node communications occur without central control or wired infrastructure. Such a network typically will have dynamic pathways and is advantageous because it is inexpensive, fault-tolerant, and flexible. Wireless networks used in accordance with the present invention preferably comprise ad hoc networks.

Each communication of an electronic message between nodes may include several components, including a header and a body. The body of the communication preferably carries the original message from the originating node and would include any data acquired at the node or by a sensor associated with the node that is to be communicated to the server. The header of the communication preferably includes information pertaining to the message itself, such as a unique "message ID" that comprises information representative of the originating node of the message and may include a count representing the number of messages originated by the originating node. In class-based networks, the message ID further may include the class or classes of the originating node.

The header of the communication also preferably includes the pathway by which the message is to be communicated when the message is being sent in accordance with a deterministic routing method of the present invention, which is described in detail below.

Other header information of the communication preferably includes the pathway history by which the message has been communicated, including the original communication from the originating node, and the link quality of each communications link between nodes in the pathway history. A possible checksum and priority optionally may be included in the message header. In class-based networks, the header of the communication also may include one or more class designations.

Exemplary Implementation

Turning now to the figures, FIG. 1 illustrates an architecture associated with an exemplary embodiment of the invention.

In FIG. 1, a server 10 is shown disposed in communication with a wide area network (WAN) 12 such as, for example, the Internet. A wireless network 14 also is represented in FIG. 1, wherein eight nodes form an ad hoc network. The eight nodes include seven nodes $X_1, X_2, X_3, X_4, X_5, X_6, X_7$ that are not directly connected to the WAN 12, and an eighth node G 16 disposed in direct electronic communication with the WAN 12, thereby serving as a gateway 16 in the wireless network 14. Each of the nodes $X_1,X_2,X_3,X_4,X_5,X_6,X_7$ may be fixed or mobile, and each of the nodes $X_1,X_2,X_3,X_4,X_5,X_6,X_7$ may exit the wireless network 14 and may or may not rejoin the wireless network 14. The eighth node G also may be mobile or fixed. Accordingly, the wireless network 14 is shown in a grid formation in FIG. 1 only for simplicity and clarity in illustrating the present invention, and it is to be understood that the spatial relationships between any of the various nodes $G,X_1,X_2,X_3,X_4,X_5,X_6,X_7$ likely will be fluid in any actual implementation.

The exemplary grid arrangement also aids in illustrating an exemplary range of communication for each node. In this respect, each node is deemed to have a communications range equal to the length of a side of one of the nine basic squares of the grid. Consequently, communications may occur between a node either to the immediate side or top or bottom of another node within the grid; however, a node disposed diagonally to another node is out of direct communications range and, therefore, direct communications between such nodes do not occur. Again, each node is shown having the same communications range only for simplicity and clarity in illustrating the present invention, and it is to be understood that the actual communications ranges of the nodes likely will vary in any actual implementation.

Communications Between Server and Nodes

In accordance with the present invention, communications between the server 10 and each node of the wireless network 14 occur in which information is acquired by the server 10 from each of the nodes. The information may include data that is stored within a computer-readable medium of the node and/or data that is acquired from a sensor that is associated with the node. In communicating with each node other than a gateway 16, the server 10 communicates via one or more intermediate nodes including a gateway 16. In communicating with a node that is a gateway 16, the server 10 communicates with the gateway 16 preferably without communicating via one or more other nodes of the wireless network 14. In communicating between nodes and between the gateway 16 and the server 10, TCP preferably is utilized as the protocol, which well known protocol is robust and accounts for error detection and correction.

Origination and communication of a message from a node to the server 10 preferably is triggered upon occurrence of a predefined event ("Trigger Event"). The Trigger Event may be based on data that is acquired by a sensor. Thus, for example, if a sensor monitors the opening of a maritime shipping container door, a Trigger Event may include the detection that the container door has been opened. In another example, if a sensor monitors for motion of an asset being tracked, a Trigger Event may include the movement of the asset.

Alternatively, or in addition thereto, Trigger Events may be predefined to occur at regular defined intervals at which times messages are originated and communicated from a node to the server 10. Such messages may include all or a portion of data that has been acquired from a sensor associated with the node. Such intervals may be determined utilizing a timer.

In addition to origination and communication of a message from a node to the server 10 upon occurrence of a Trigger Event, a message also may be originated and communicated from a node to the server 10 in response to an inquiry that is received by and directed to the node, a response to which is included in the message.

Communicating Via Pathways in the Wireless Network: Deterministic Vs. Nondeterministic Routing Upon occurrence of a Trigger Event, and assuming that the originating node is other than a gateway 16, a message is originated and communicated from the originating node to a neighboring node. Two scenarios exist in this situation. First, a particular pathway for reaching a gateway 16 may be known to the originating node. In this first scenario, the wireless network 14 is deemed a "Deterministic Network," at least to the extent that the originating node can provide determined routing information in the communication of the message, whereby the message will be sent to the gateway 16 via the identified pathway. In the second scenario, a pathway for reaching a gateway 16 is not known by the originating node, and the wireless network 14 is deemed a "Nondeterministic Network," at least to the extent that the originating node does not know and, therefore, cannot provide determined routing information identifying a pathway for communication of the message to a gateway 16. Each of these scenarios will be discussed in greater detail below. The nondeterministic network scenario is described in detail first.

Nondeterministic Routing Illustration: Node to Server Communication

FIGS. 2-8 illustrate the wireless network 14 of FIG. 1 in which a Trigger Event occurs at node $X_7$ and a sequence of node-to-node communications takes place thereafter. Because of the occurrence of the Trigger Event, a message is originated and communicated from node $X_7$ for further communication to the server 10. The sequence of node-to-node communications illustrated here is in accordance with nondeterministic routing and may occur, for example, when none of the nodes $X_1$ through $X_7$ have previously communicated with the server 10 through the wireless network 14, i.e., when each node may be "new" to the wireless network 14 and/or "new" to the wireless network topology shown in FIG. 1.

Figure 2:
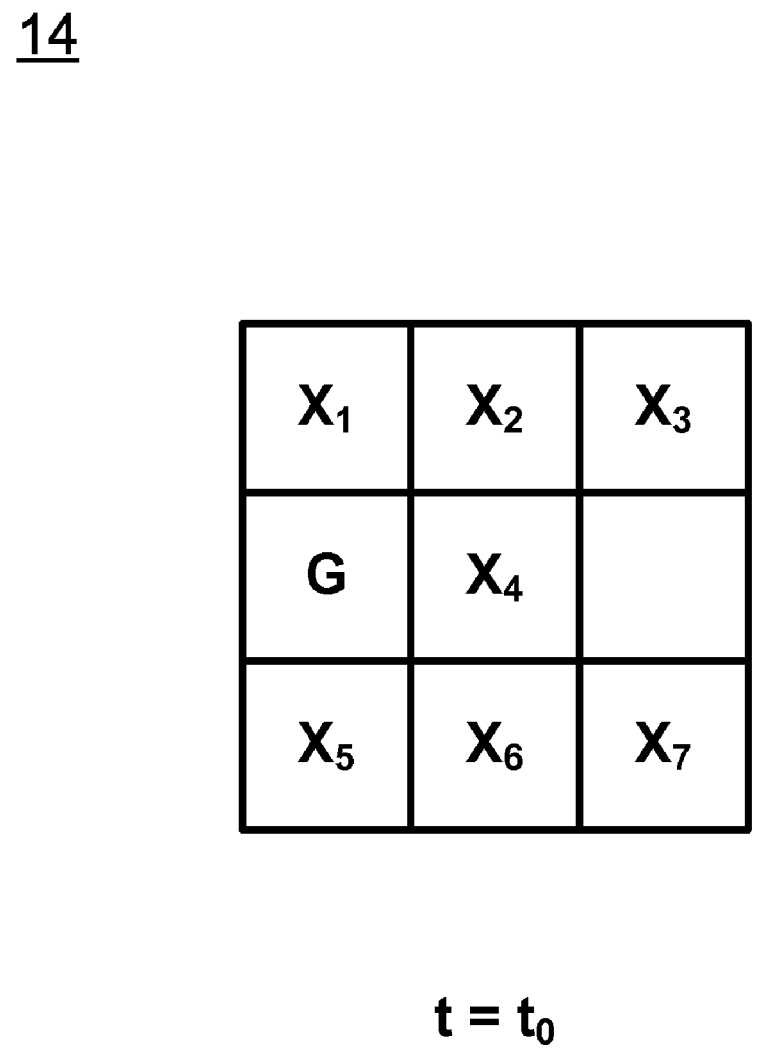
Figure 3:
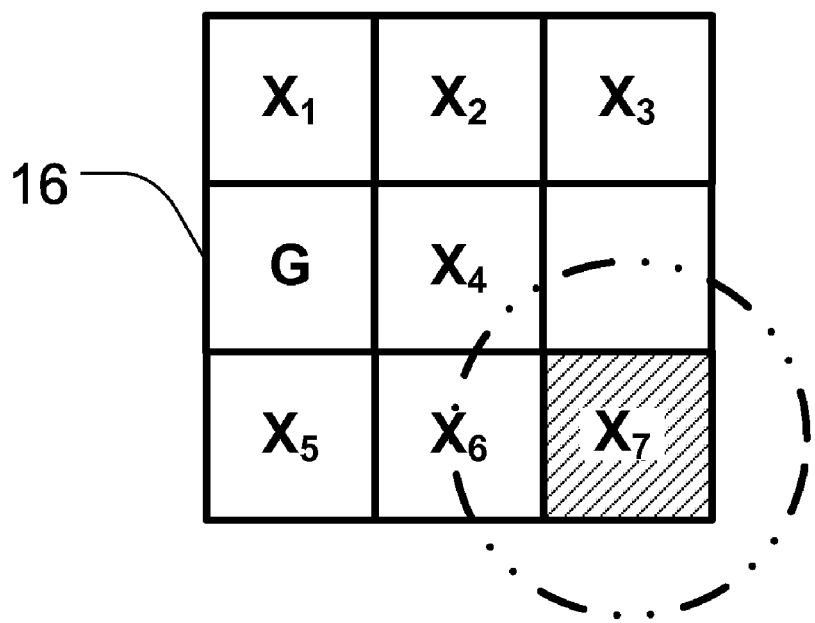

With particular regard to certain steps in the sequence of communicating the message from node $X_7$ to the gateway 16, FIG. 2 illustrates the wireless network 14 at time $t=t_0$ before any message has been originated or communicated. In contrast thereto, at time $t=t_1$ a Trigger Event (FIG. 3) has occurred at node $X_7$, and a message as been originated at node $X_7$. At this time the pathway for reaching a gateway 16 in the wireless network 14 is unknown to the data communication device of node $X_7$. In accordance with the present invention, because the pathway is unknown, the message is communicated generally to all data communication devices falling within communications range of node $X_7$. The message therefore is shown in FIG. 3 being communicated at time $t=t_1$ to neighboring node $X_6$, which node happens to be within the communications range of node $X_7$. Indeed, the communications range of node $X_7$ is graphically illustrated in FIG. 3 by the generally circular outline around node $X_7$, within which only node $X_6$ at least partially lies. Nodes within the communications range of node $X_7$, i.e., node $X_6$, also are explicitly identified in the range definition set forth in FIG. 3. The act of communicating the message by node $X_7$ further is graphically illustrated in FIG. 3 by shading of the square of the grid containing node $X_7$.

Furthermore, it will be appreciated from the foregoing description that in communicating the message from node $X_7$ to node $X_6$, a communications link first was established between these two nodes. In establishing the communications link, preferably each node is identified to the other node in the communications link, whereby the originating node will come to learn the neighboring node that falls within its communications range (at least at that time). Furthermore, node $X_6$—an intermediate node—will come to learn the node from which the message is received for forwarding to a gateway 16. In establishing the communications link and in communicating the message, information regarding the quality of the link also may be monitored and recorded.

Figure 4:
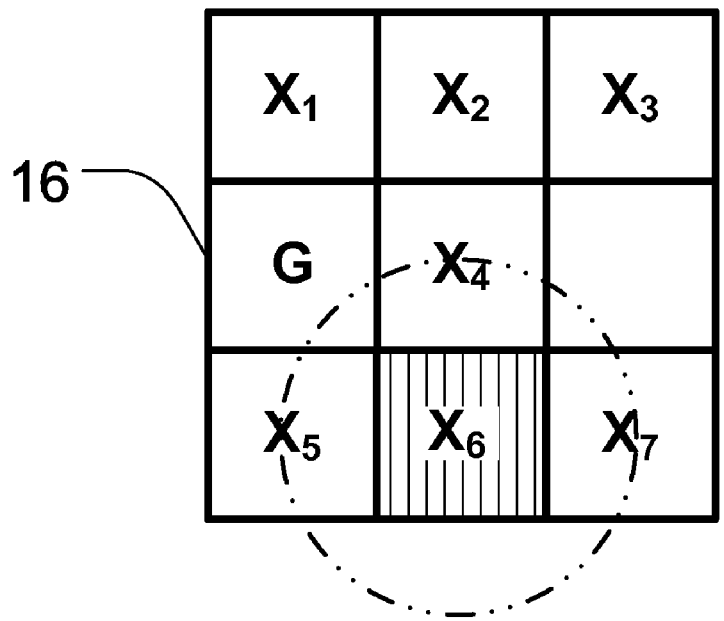

At time $t=t_2$, the message is shown in FIG. 4 being communicated by node $X_6$ to neighboring nodes $X_4,X_5,X_7$, which nodes happen to be within the communications range of node $X_6$. Again, because node $X_6$ does not know a pathway to the gateway 16, node $X_6$ proceeds to communicate the message generally to all nodes within its communications range following the same protocol as originating node $X_7$. The communications range of node $X_6$ is graphically illustrated in FIG. 4 by the generally circular outline around node $X_6$, within which only nodes $X_4,X_5,X_7$ each at least partially lies. Nodes within the communications range of node $X_6$, i.e., nodes $X_4,X_5,X_7$, also are explicitly identified in the range definition set forth in FIG. 4. The act of communicating the message by node $X_6$ further is graphically illustrated in FIG. 4 by shading of the square of the grid containing node $X_6$.

Figure 5:
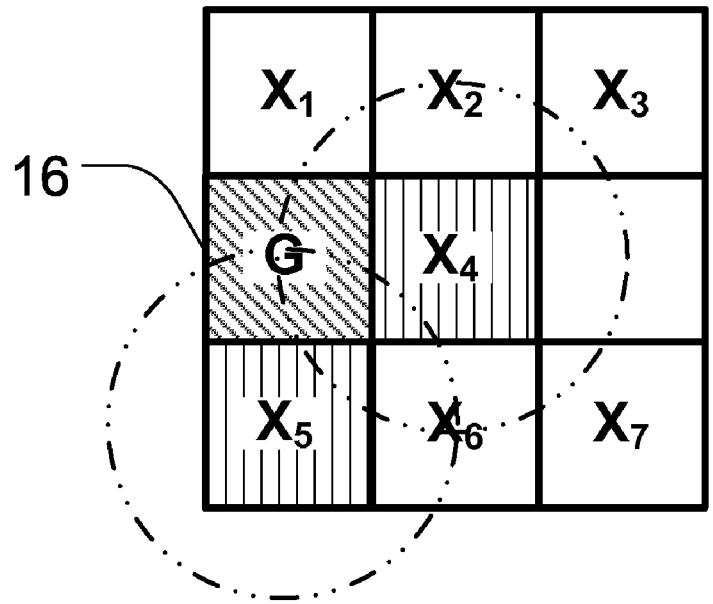

At time $t=t_3$, the message is shown in FIG. 5 being communicated by each of nodes $X_4,X_5$ to respective neighboring nodes that happen to be within communications range. The communications range of node $X_4$ is graphically illustrated by the generally circular outline around node $X_4$ in FIG. 5, and the communications range of node $X_5$ is graphically illustrated by the generally circular outline around node $X_5$ in FIG. 5. As further identified in FIG. 5, nodes $X_2,G,X_6$ each at least partially lies within the communications range of node $X_4$, and nodes $G,X_6$ each at least partially lies within the communications range of node $X_5$. The act of communicating the message by node $X_4$ further is graphically illustrated in FIG. 5 by shading of the square of the grid containing node $X_4$, and the act of communicating the message by node $X_5$ further is graphically illustrated in FIG. 5 by shading of the square of the grid containing node $X_5$. Receipt of a communication containing the message by node G at time $t=t_3$ also is emphasized in FIG. 5 by shading of the square of the grid containing node G.

Furthermore, it should be noted that although node $X_7$ received the communication from node $X_6$, node $X_7$ does not communicate the message a second time. Preferably, a message that has been communicated from a node is stored or cached within memory of the data communication device of the node, and before a message received from another node is forwarded, the message is screened against those messages stored or cached within memory. Alternatively, a message ID of a message that has been communicated from a node preferably is stored or cached within memory of the data communication device of the node, and before a message received from another node is forwarded, the message ID of that message is screened against the message IDs stored or cached within memory. In either case, if it is determined that a message previously has been communicated from the node, then the same message will not be communicated again from the node. Consequently, node $X_7$ is not illustrated in FIG. 5 as communicating the message again. Only nodes $X_4,X_5$, which have not previously communicated the message, are shown in FIG. 5 as communicating the message.

Figure 6:
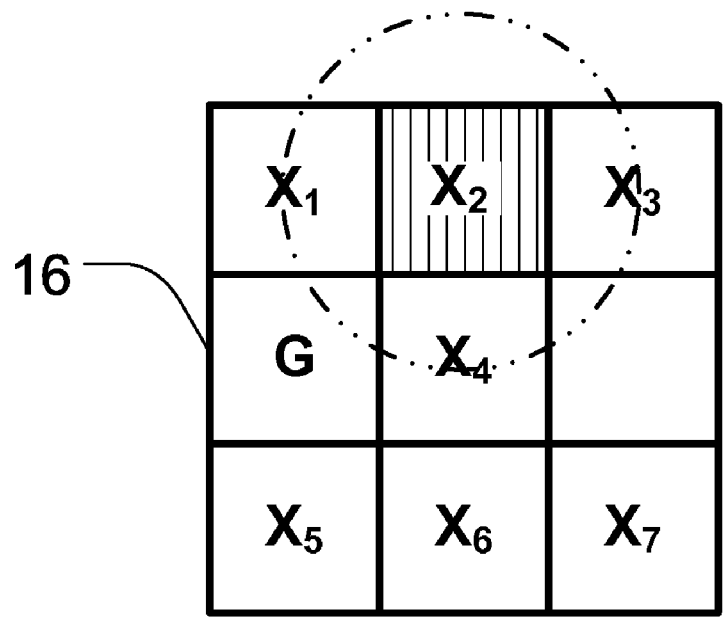

At time $t=t_4$, the message is shown in FIG. 6 being communicated to neighboring nodes $X_1,X_3,X_4$, which nodes happen to be within the communications range of node $X_2$. The communications range of node $X_2$ is graphically illustrated in FIG. 6 by the generally circular outline around node $X_2$, within which only nodes $X_1,X_3,X_4$ each at least partially lies. The nodes within the communications range of node $X_2$, i.e., nodes $X_1,X_3,X_4$, also are explicitly identified in the range definition set forth in FIG. 6. The act of communicating the message by node $X_2$ further is graphically illustrated by shading of the square of the grid containing node $X_2$. Node G, which also received the message at $t=t_3$, does not communicate the message to other nodes in the wireless network 14 like node $X_2$. Instead, node G is in communications with the external network and knows that the pathway to the server 10 from node G does not include any of the nodes within the wireless network 14. Consequently, node G does not communicate the message within the wireless network 14 because it knows that it is unnecessary to do so in order to communicate the message to the server 10. More generally, if a node knows of a deterministic pathway to a destination node when it receives a communication via nondeterministic routing, then the node may further communicate the message via the known deterministic pathway from that point forward.

Figure 7:
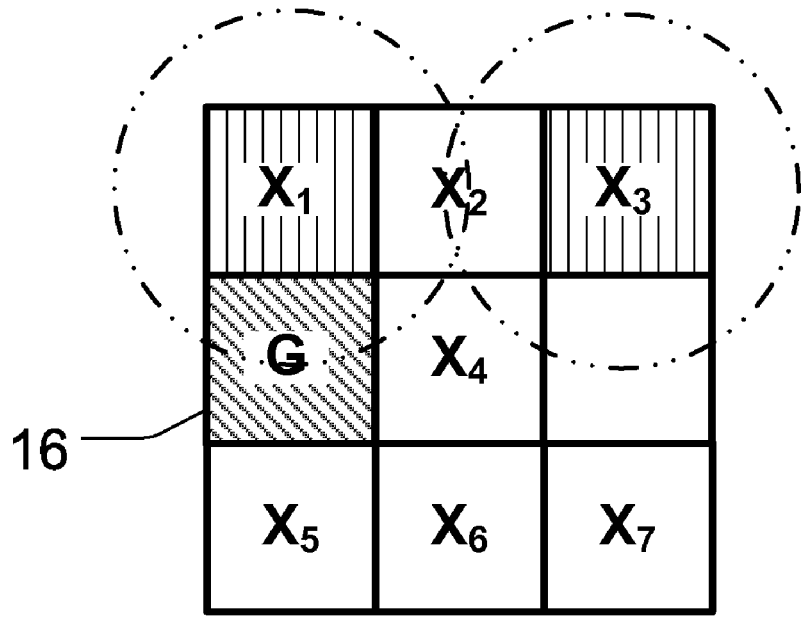

At time $t=t_5$, the message is shown in FIG. 7 being communicated by each of nodes $X_1,X_3$ to respective neighboring nodes that happen to be within communications range. The communications range of node $X_1$ is graphically illustrated by the generally circular outline around node $X_1$ in FIG. 7, and the communications range of node $X_3$ is graphically illustrated by the generally circular outline around node $X_3$ in FIG. 7. As further identified in FIG. 7, nodes $G,X_2$ each at least partially lies within the communications range of node $X_1$, and node $X_2$ at least partially lies within the communications range of node $X_3$. The act of communicating the message by node $X_1$ further is graphically illustrated by shading of the square of the grid containing node $X_1$, and the act of communicating the message by node $X_3$ further is graphically illustrated by shading of the square of the grid containing node $X_3$. Receipt of a communication containing the message by node G at time $t=t_5$ also is emphasized in FIG. 7 by shading of the square of the grid containing node G.

Figure 8:
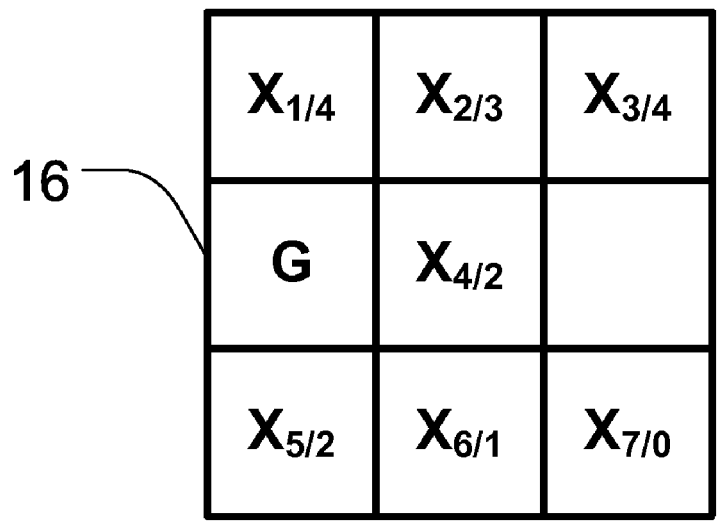

At time $t=t_6$, the message now has been communicated to the gateway 16 by way of three different pathways, the message has been propagated generally to all nodes of the wireless network 14, and no further communication of the message within the wireless network 14 occurs, as illustrated in FIG. 8. Moreover, each node is identified in FIG. 8 with reference to the number of "hops" that occurred in receiving the message (for the first time) from the originating node.

In accordance with preferred implementations, when node G (the gateway 16) receives the message intended for the server 10, the message is communicated to the server 10. Together with the message, the following information also preferably is communicated from the gateway 16 to the server 10: the pathway, including the identification of the originating node and each intermediate node by which the message was communicated; and the link quality of each communications link of the pathway. Other information also may be communicated, as desired.

Based on the illustration set forth in FIGS. 2-8, the server 10 of FIG. 1 will receive three communications of the message from the gateway 16. In accordance with the present invention, the server 10 will record, for each receipt of the message, the pathway by which the message was communicated, including the identification of the originating node and each intermediate node by which the message was communicated. The server 10 additionally will record the link quality of each communications link in the pathway and will calculate a representative overall link quality for each pathway. Any other information communicated with the message also may be recorded in association therewith.

For purposes of illustration and understanding of the present invention, a table setting forth exemplary link qualities of each possible communications link in the wireless network topology of FIG. 1 is shown in FIG. 9. In these examples, the link quality is represented by a percentage of packets that are successfully transmitted to total transmitted packets. (It should be noted that differences in link quality are overstated in order to emphasize differences in link quality in FIG. 9 and differences in overall link quality in FIG. 10. In actuality, the differences in link quality between a "good link" and a "poor link" are typically much smaller. It further should be noted that other means for determining link quality can be utilized, such as by monitoring the number of packets that are retransmitted between two nodes.)

Notably, in the foregoing illustration of FIGS. 2-8, the server 10 will not record the link quality for the communications link between respective data communication devices of nodes $X_2$ and $X_3$. This communications link will not be recorded by the server 10 because no pathway included node $X_3$. Thus, the server 10 will receive and record the link quality for all possible links except the communications link between respective data communication devices of node $X_2$ and node $X_3$. A table setting forth exemplary link qualities for all links known to the server 10 is shown in FIG. 11.

Additionally, for purposes of illustration and understanding of the present invention, a table setting forth exemplary overall link qualities of each possible pathway is shown in FIG. 10. The overall link quality shown here is based on the link quality for each node-to-node communications link set forth in the table of FIG. 9, and is achieved through multiplication of the individual link qualities making up a particular pathway. In the foregoing illustration of FIGS. 2-8, the server 10 will be able to calculate the overall link quality for all pathways in the wireless network 14 except for the pathways that include node $X_3$. A table setting forth exemplary overall link qualities for all pathways known to the server 10 is shown in FIG. 12.

It is revealing to note that the tables of FIGS. 9-10 and the tables of FIGS. 11-12 do not differ significantly, and that a significant amount of information has been learned by the server 10 about the wireless network 14 upon the single message having been originated and communicated from node $X_7$ (i.e., the data communication device thereof) in the nondeterministic manner. (It should be noted that the identification of the nodes in the tables of FIGS. 9-12 represent the data communication devices of the nodes and that each data communication device is identified by a unique identifier.)

Furthermore, several observations of characteristics of the wireless network 14 and manner of communicating as set forth in FIGS. 2-8 should now be apparent to the Ordinary Artisan.

For example, it should be apparent that no node of the wireless network 14 will appear twice in any pathway.

Second, it should be apparent that a node must either be an originating node or an intermediate node in a pathway by which a message is successfully communicated to the server 10 in order for the server 10 to gain information regarding that node.

Third, a message sent in nondeterministic manner from an originating node that arrives via the same gateway 16 from two top level nodes evidences the fact that the two top level nodes each represents an ad hoc network in which the nodes of the particular network are disposed in communication with each other. Conversely, a message sent in nondeterministic manner from an originating node that arrives via a gateway 16 from only one of two or more known top level nodes evidences the fact that the top level node represents an ad hoc network in which nodes of that network are disposed in radio isolation from all other nodes of the other ad hoc networks represented by the other top level nodes. In the exemplary wireless network 14 of FIGS. 1-8, top level nodes include nodes $X_1$, $X_4$, and $X_5$. There are no isolated ad hoc networks shown in FIG. 8.

Deterministic Routing Illustration: Server to Node Communication

A deterministic routing illustration is readily described based on the information obtained from the nondeterministic routing illustration of FIGS. 2-8. In this regard, if a message such as an inquiry or command is to be sent from the server 10 to a data communication device of a node of the wireless communications network 14, the information received by the server 10 preferably is utilized in sending the message via a known pathway that includes the recipient node as the last node of the pathway. In particular, if the server 10 is to send a message, for example, to node $X_7$, then the server 10 preferably searches the known pathways in Table 4 of FIG. 12 and identifies each pathway that ends with the data communication device of node $X_7$. Of all such pathways that are identified, the server 10 preferably sends the message along one of the pathways that is selected to be the "best" based on one or more predefined parameters and/or algorithms.

An exemplary algorithm that may be used includes selecting the pathway having the shortest number of intermediate nodes, thereby reducing the number of "hops" that must occur in successfully communicating the message to the destination node. In other words, the "shortest" known pathway is selected. Referring to the Table 4 of FIG. 12, two pathways comprise the shortest pathways, and are represented by the notations //G/X4/X6/X7 and //G/X5/X6/X7.

In selecting the "best" of these two "shortest" pathways, additional factors may be considered, such as the overall link quality of the pathway, with the pathway having the best overall link quality being selected. In this case, the first pathway has an overall link quality of 24.3% which exceeds, in this case substantially, the overall link quality of 8.1% of the second pathway and, thus, the first pathway preferably would be selected as the determined route for sending the message from the server 10 to the data communication device of node $X_7$.

Another algorithm for selecting a pathway may comprise selecting the pathway having the best overall link quality without regard to the number of intermediate nodes or hops. For example, with reference to Table 4 of FIG. 12, a message to be communicated to the data communication device of node $X_5$ would be sent via pathway //G/X4/X6/X5 in accordance with this algorithm, even though pathway //G/X5 is the shortest, because the overall link quality of the longer pathway is 72.9% compared to the overall link quality of the shorter pathway of 30%. The unexpected difference in link qualities may be attributed, for example, to environmental factors including radio frequency obstacles. Moreover, such radio frequency obstacles can be inferred from the data that is collected with messages received from the wireless network 14, including the various pathways and link qualities, as shown in the tables. Inferences that may be drawn include the absolute or relative locations of radio frequency obstacles if absolute or relative locations of the data communication devices of certain nodes is known. Such information, for example, can be acquired from GPS sensors and the like that are included or associated with these data communication devices.

Dynamic Nature of the Ad Hoc Wireless Network and Continual Maintenance of Routing Tables Due to the nature of the ad hoc network and the mobility of one or more of the data communication devices of the nodes thereof, the wireless network topology likely will change over time. Consequently, pathways and link qualities will change, and pathways and link qualities recorded in any table that may be maintained by the server 10 likely will become outdated. To address this, the server 10 preferably updates any such table as each message and associated information is received from the wireless network 14. Due to the significant amount of information that may be received from the wireless network 14 with any given message, information maintained by the server 10 nevertheless may prove valuable during its useful life. Moreover, information that is outdated may be identified based on more recent information that is received by the server 10 with another message, as well as by the failure to receive an acknowledgement ("ACK") in response to a communication by the server 10 to a particular node of the wireless network 14 via a previously known pathway. An entry for a pathway by which a message is not successfully sent from the server 10 to a node may be removed, together with all sub-pathways including the destination node of the message.

Acknowledging Successful Receipt of a Message: Sending an ACK

Upon the successful receipt of a message by the server 10, the server 10 preferably sends an ACK to the originating node of the message to acknowledge the successful receipt of the message. Preferably, only one ACK is sent for each particular message, regardless of the number of times that the particular message is received by the server 10 via different pathways. In sending the ACK, the server 10 preferably selects a known pathway based on information that is received with the message or that has been received in conjunction with previous messages or other intelligence that is known about the network topology. Selection of the particular pathway is made in accordance with one of the disclosed algorithms or in accordance with some other algorithm, as desired. If an ACK is not received from the server 10 by the originating node, then the originating node will save the message in memory for communication at a later time when communication with the server 10 is available, whether via the wireless network 14 of FIGS. 1-8 or via a future wireless network.

Similarly, the receipt of a message representing a command or inquiry that is sent by a server 10 to a destination node preferably is acknowledged by an ACK being sent to the server 10 from the destination node. The message may be sent via a known pathway, or, if the pathway is outdated or otherwise unknown, then the message is sent in accordance with the nondeterministic routing method of the present invention. In particular, the message is communicated to the wireless network in which the destination node is likely to be found. The message then propagates through the nodes of that wireless network and, when the destination node receives the message, the ACK is communicated by the destination node to the server 10. Moreover, like the server 10 in the implementation illustrated in FIGS. 2-12, the node in this case will have sufficient information upon receipt of the message to select the "best" pathway for communicating the ACK back to the server 10. Additionally, if an ACK is not received by the server 10, then the server 10 can store or cache the message for later communication, or the server 10 can communicate the message to one or more other suspected wireless networks in which the data communication device of the destination node (the actual recipient of the message) may be found.

In accordance with preferred implementations, the successful receipt of an ACK is not acknowledged in order to avoid a recurring chain of communications.

Sleep/Standby Functionality & Corresponding Wake-Up

In order to lessen power consumption, especially in mobile settings in which each data communication device constituting a node is self-powered by a mobile power supply, each mobile data communication device preferably includes the capability of powering down to a standby or sleep state, in which power is consumed at a substantially lower rate than when the data communication device is in a fully active state. In particular, the radio of the data communication device of the node preferably includes this capability to go into a standby or sleep mode. In such a mode, a standards based radio even may be turned completely off to be later awakened by a passive or semi-passive receiver of the data communications device designed for such purpose.

If mobile data communication devices and, in particular, radios thereof, include a standby or sleep capability, then each such radio further preferably includes the capability of being awakened in response to a communication from another data communication device of another node of the wireless network 14. Moreover, such a radio of a node preferably includes the ability to be selectively awakened—or powered up—out of a population of similar radios of data communication devices of nearby nodes. In this respect, implementations of the present invention preferably include the ability to power down and be selectively powered up in accordance with the technologies set forth in Twitchell U.S. Patent Application Publication No. 2005/0093703 A1, and/or Twitchell U.S. patent application Ser. No. 11/422,321, each of which has been incorporated herein by reference above.

First Responder Implementation

The present invention has utility in various implementations. For example, the present invention may be utilized in first responder scenarios in order to maintain and gather real time intelligence that will aid first responders on the scene of an emergency.

For example, firemen responding to a building fire preferably can temporarily place data communication devices at points along their entry into a building or other structure in combating a fire. Basically, the firemen, upon entering into the building, can leave a "trail of breadcrumbs" comprising nodes of an ad hoc wireless network, and communications between the nodes thereof may be carried out in accordance with the present invention. A data communication device of a node further may be carried on a fireman's person. Such data communication devices further can be shot, thrown, or otherwise inserted into the building in placing one or more nodes of the ad hoc networks.

In further accordance with this exemplary implementation, each data communication device preferably includes a heat and/or smoke sensor for communicating data indicative of the level or heat and/or smoke at the sensor. The data then may be communicated back to a computer (e.g., the server 10 of FIG. 1) located either at a central emergency operations center or at the exterior of the building. Information regarding the spread of the fire and any exits that may have been cut off can be monitored and any appropriate actions or responses can be coordinated from the exterior of the building.

More importantly perhaps, each data communication device further preferably includes the capability of establishing two-way communications between the firemen inside the building and firemen outside of the building so that the fire fighting efforts inside the building may be coordinated from outside of the building. In this respect, each node preferably includes a data communication device having the capability for establishing a duplex communications link with other data communication devices of other nodes. Indeed, by including multiple nodes along different pathways from the exterior of the building to the firemen in the interior of the building, communications can be established that otherwise could not be established directly between an exterior radio and a radio of a fireman in a remote location in the interior of the building.

Class-Based Networks

Figure 13:
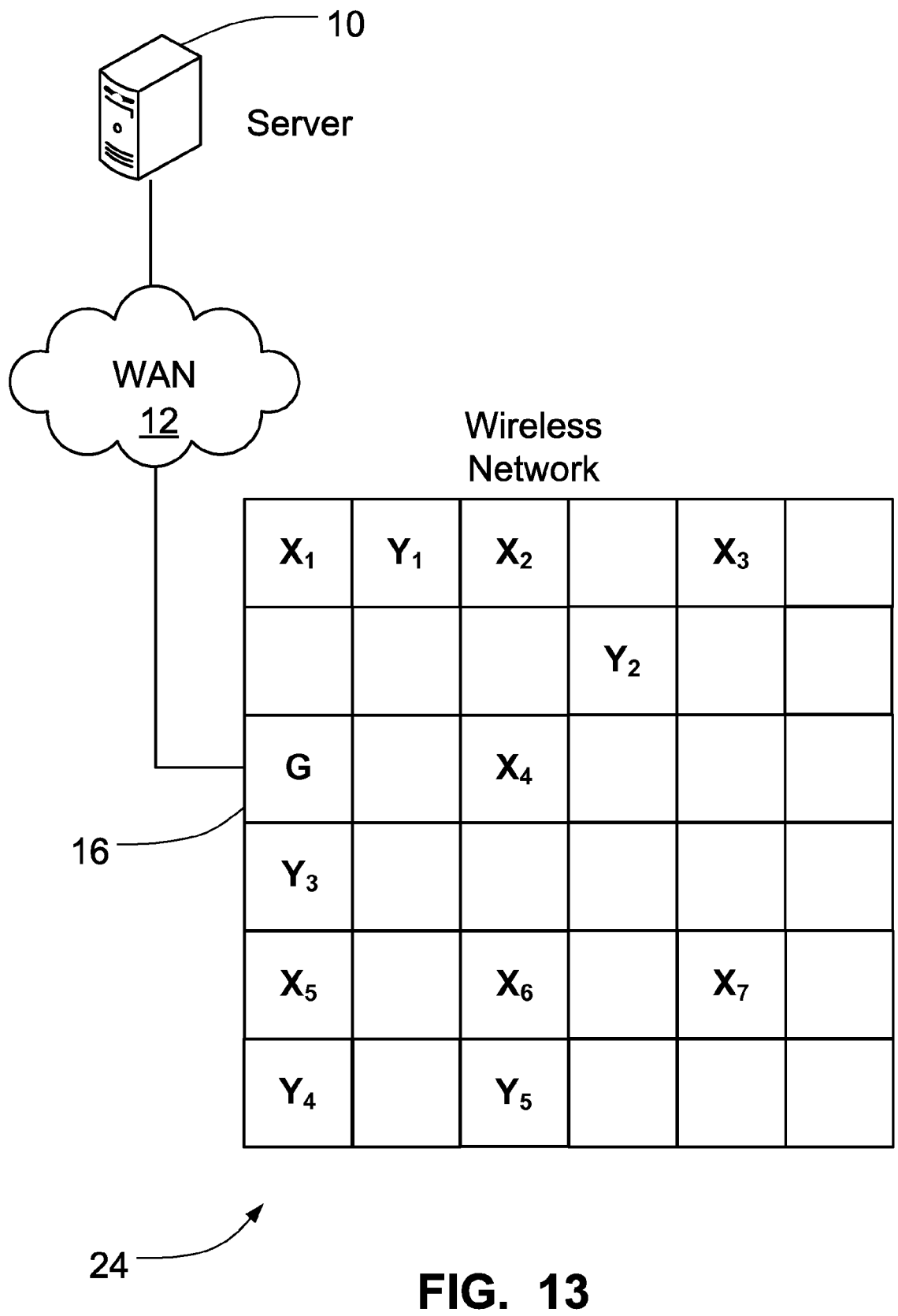
FIG. 13 illustrates another architecture associated with exemplary embodiments of the invention in which class-based wireless networks are utilized.

Another architecture associated with an exemplary embodiment of the invention is illustrated in FIG. 13. In FIG. 13, a server 10 is shown disposed in communication with a wide area network (WAN) 12 such as, for example, the Internet. A wireless network 24 also is represented in FIG. 13 having thirteen nodes including: seven nodes $X_1,X_2,X_3,X_4,X_5,X_6,X_7$, none of which are directly connected to the WAN 12; five nodes $Y_1,Y_2,Y_3,Y_4,Y_5$, none of which are directly connected to the WAN 12; and a thirteenth node G disposed in direct electronic communication with the WAN 12 and serving as a gateway 16. Each of the nodes $X_1,X_2,X_3,X_4,X_5,X_6,X_7,Y_1,Y_2,Y_3,Y_4,Y_5$ may be fixed or mobile, and each of the nodes $X_1,X_2,X_3,X_4,X_5,X_6,X_7,Y_1,Y_2,Y_3,Y_4,Y_5$ may exit the wireless network 24 and may or may not rejoin the wireless network 24. Node G also may be fixed or mobile. Accordingly, the wireless network 24 is shown in a grid formation in FIG. 13 only for simplicity and clarity in illustrating the present invention, and it is to be understood that the spatial relationships between any of the various nodes $X_1,X_2,X_3,X_4,X_5,X_6,X_7,Y_1,Y_2,Y_3,Y_4,Y_5$ likely will be fluid in any actual implementation.

Furthermore, while the twelve nodes $X_1,X_2,X_3,X_4,X_5,X_6,X_7,Y_1,Y_2,Y_3,Y_4,Y_5$ generally have been described as forming the wireless network 24 of FIG. 13, it will be appreciated that subsets of these nodes (and, specifically, subsets of the data communication devices of these nodes) actually may form their own wireless network comprising an intranet to the exclusion of the other nodes. In this regard, each of nodes $X_1,X_2,X_3,X_4,X_5,X_6,X_7$ may represent one or more certain classes and include class designations corresponding to those classes. In the example, these nodes are deemed to have a class designation of "X". Similarly, nodes $Y_1,Y_2,Y_3,Y_4,Y_5$ may represent one or more certain classes and include class designations corresponding to those classes. In the example, these nodes are deemed to have a class designation of "Y". Node G, which serves as the gateway 16 for both class-based networks, preferably includes both "X" and "Y" class designations. Class designations and class-based networks are described in detail in the incorporated references, including U.S. Pat. No. 6,745,027 and Application Publication No. US 2004/0082296A1. Each class of network may be associated with asset tracking or monitoring or, more generally, with sensors for data acquisition used for asset tracking or monitoring, or otherwise.

In accordance with class-based networks, nodes $X_1,X_2,X_3,X_4,X_5,X_6,X_7$ form a network of the class "X" and nodes $Y_1,Y_2,Y_3,Y_4,Y_5$ form a network of the class "Y"; communications directed to the "X" class network are not received and further processed or transmitted by the "Y" class nodes; and communications directed to the "Y" class network are not received and further processed or transmitted by the "X" class nodes. Additionally, each node preferably includes an overriding class designation such as "A" that is representative of all nodes of the overall wireless network 24 of FIG. 13, whereby communications directed to the "A" class will be received and further processed and/or transmitted by all nodes $X_1,X_2,X_3,X_4,X_5,X_6,X_7,Y_1,Y_2,Y_3,Y_4,Y_5$.

The exemplary grid arrangement also aids in illustrating an exemplary range of communication for each node. In this respect, and with particular regard to FIG. 13 and figures thereafter, each node is deemed to have a communication range equal to the length of two sides of one of the thirty-six basic squares of the illustrated grid.

Consequently, communications may occur between a node that is within two spaces to the immediate side or top or bottom of another node within the grid, or between a node that is immediately diagonal to another node; however, a node disposed diagonally at two spaces or more to another node is out of direct communication range and, therefore, direct communications between such nodes do not occur. Again, each node is shown having the same communications range only for simplicity and clarity in illustrating the present invention, and it is to be understood that the actual communications ranges of the nodes likely will vary in any actual implementation.

Communications Between Server and Nodes in the Class-Based Networks

As described above with reference to FIGS. 1-12, and in accordance with the present invention, communications between the server 10 and each node of the class-based wireless networks in FIGS. 13-30 occur in which information is acquired by the server 10 from each of the nodes. The information may include data that is stored within a computer-readable medium of the node and/or data that is acquired from a sensor that is associated with the node. In communicating with each node other than a gateway 16, the server 10 communicates via one or more other nodes including a gateway 16. In communicating with a node that is a gateway 16, the server 10 communicates with the gateway 16 preferably without communicating via one or more other nodes of the wireless network 24. In communicating between nodes and between the gateway 16 and the server 10, TCP preferably is utilized as the protocol, which well known protocol is robust and accounts for error detection and correction.

Origination and communication of a message from a node to the server 10 preferably is triggered upon occurrence of a predefined event ("Trigger Event"). The Trigger Event may be based on data that is acquired by a sensor. Thus, for example, if a sensor monitors the opening of a maritime shipping container door, a Trigger Event may include the detection that the container door has been opened. In another example, if a sensor monitors for motion of an asset being tracked, a Trigger Event may include the movement of the asset.

Alternatively, or in addition thereto, Trigger Events may be predefined at regular defined intervals upon which messages are originated and communicated from a node to the server 10. Such messages may include all or a portion of data that has been acquired from a sensor associated with the node.

In addition to origination and communication of a message from a node to the server 10 upon occurrence of a Trigger Event, a message also may be originated and communicated from a node to the server 10 in response to an inquiry that is received by and directed to the node, a response to which is included in the message.

Communicating Via Pathways in the Class-Based Wireless Networks: Deterministic Vs. Nondeterministic Routing Upon occurrence of a Trigger Event, and assuming that the originating node is other than a gateway 16, a message is originated and communicated from the originating node to a neighboring node within a class-based network. Two scenarios exist in this situation. First, a particular pathway for reaching a gateway 16 may be known to the originating node. In this first scenario, the class-based wireless network is deemed a deterministic network, at least to the extent that the originating node can provide determined routing information in the communication of the message, whereby the message will be sent to the gateway 16 via the identified pathway. In the second scenario, a pathway for reaching a gateway 16 is not known by the originating node, and the class-based wireless network is deemed a nondeterministic network, at least to the extent that the originating node does not know and, therefore, cannot provide determined routing information identifying a pathway for communication of the message to a gateway 16. Each of these scenarios will be discussed in greater detail below. The nondeterministic network scenario is described in detail first with reference to FIGS. 14-19 with two separate illustrations: one in connection with the "X" class-based network and one in connection with the "Y" class-based network.

Nondeterministic Routing Illustrations: Node to Server Communication in Each Class-Based Network FIGS. 14-19 illustrate the "X" class-based wireless network of FIG. 13 in which the sequence of node-to-node communications takes place following occurrence of a Trigger Event at node $X_7$. Because of the occurrence of the Trigger Event, a message is originated and communicated from node $X_7$ for further communication to the server 10. The sequence of node-to-node communications illustrated here is in accordance with nondeterministic routing and may occur, for example, when nodes $X_1$ through $X_7$ have not previously communicated with the server 10 through the wireless network, i.e., when each node may be "new" to the "X" class-based wireless network and/or "new" to the wireless network topology thereof shown in FIG. 13.

Figure 14:
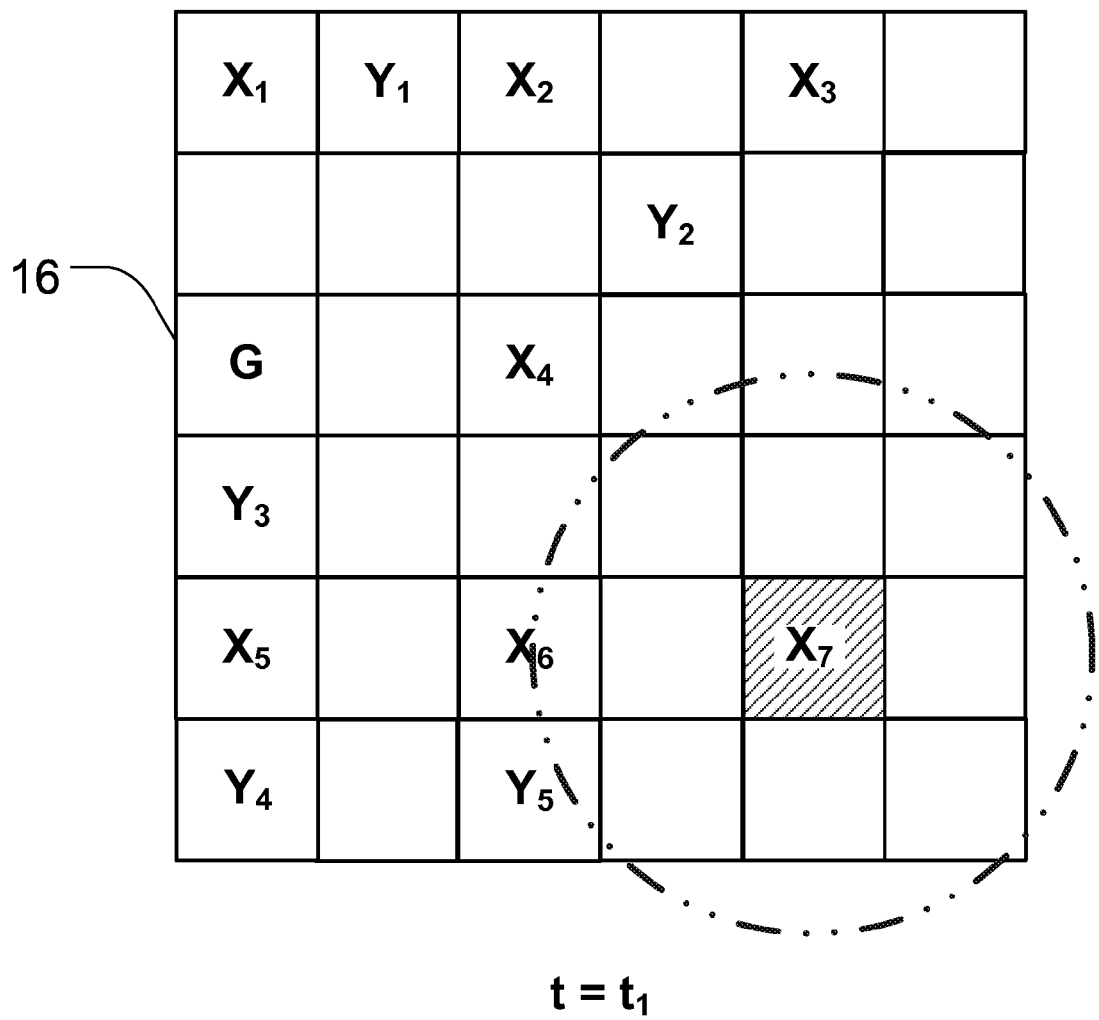
FIGS. 14-30 illustrate network routing in the class-based wireless networks of FIG. 13.

With particular regard to certain steps in the sequence of communicating the message from node $X_7$ to the gateway 16, FIG. 14 illustrates the wireless network 24 at time $t=t_1$ when a Trigger Event has occurred at node $X_7$ and a message as been originated at node $X_7$. At this time the pathway for reaching a gateway 16 in the "X" class-based wireless network is unknown to the data communication device of node $X_7$. Accordingly, the message is communicated generally to all data communication devices of class "X" falling within the communications range of node $X_7$. The message therefore is shown in FIG. 14 being communicated at time $t=t_1$ to neighboring node $X_6$, which node happens to be within the communications range of node $X_7$. Indeed, the communications range of node $X_7$ is graphically illustrated in FIG. 14 by the generally circular outline around node $X_7$, within which only node $X_6$ at least partially lies. The act of communicating the message by node $X_7$ further is graphically illustrated in FIG. 14 by shading of the square of the grid containing node $X_7$.

Furthermore, it will be appreciated from the foregoing description that in communicating the message from node $X_7$ to node $X_6$, a communications link first was established between these two nodes. In establishing the communications link, preferably each node is identified to the other node, whereby the originating node will come to learn the neighboring node that falls within its communications range (at least at that time). Furthermore, node $X_6$—an intermediate node—will come to learn from which node the message is received for forwarding to a gateway 16. In establishing the communications link and in communicating the message, information regarding the quality of the link also is monitored and recorded.

Figure 15:
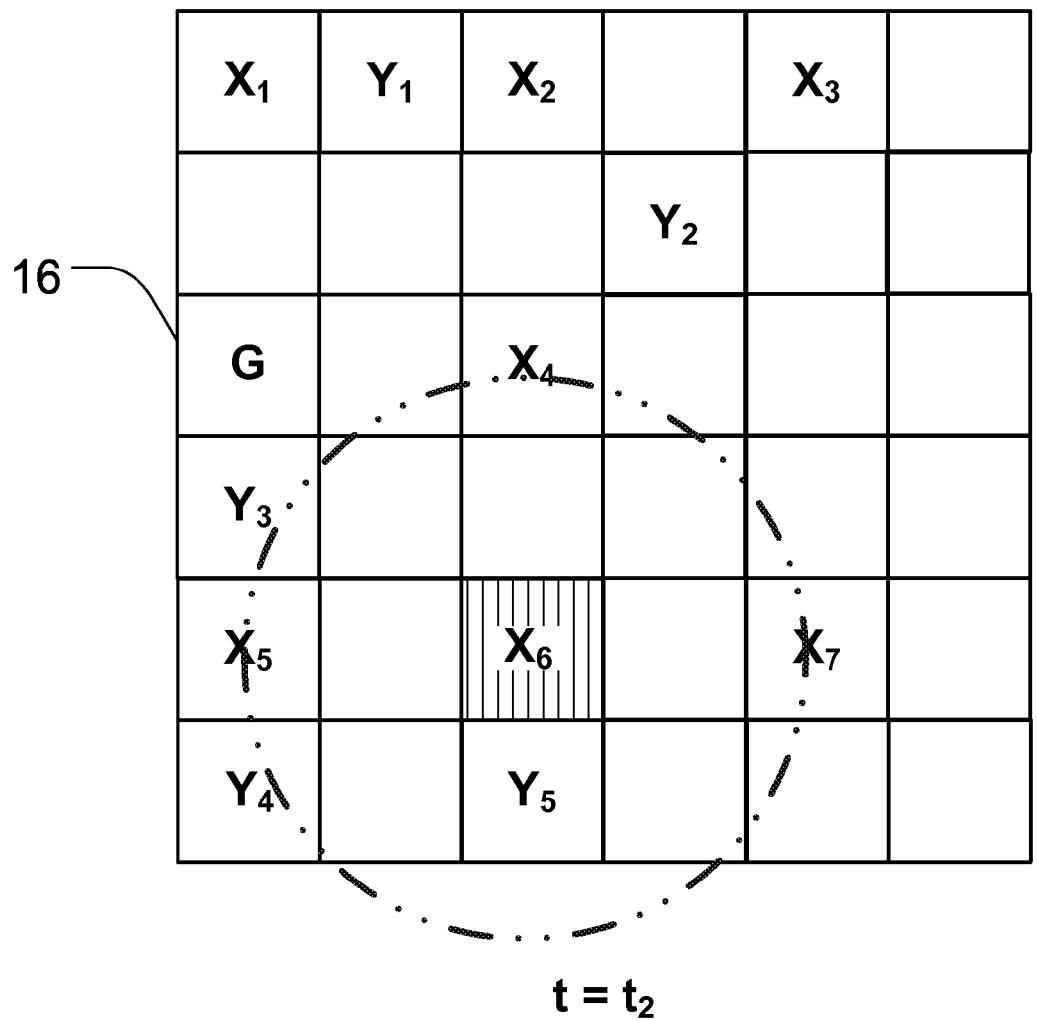

At time $t=t_2$, the message is shown in FIG. 15 being communicated by node $X_6$ to neighboring nodes $X_4,X_5,X_7$, which nodes happen to be within the communications range of node $X_6$. Again, because node $X_6$ does not know a pathway to the gateway 16, node $X_6$ proceeds to communicate the message generally to all nodes within its communications range following the same protocol as originating node $X_7$. The communications range of node $X_6$ is graphically illustrated in FIG. 15 by the generally circular outline around node $X_6$, within which only nodes $X_4,X_5,X_7$ each at least partially lies. The act of communicating the message by node $X_6$ further is graphically illustrated in FIG. 15 by shading of the square of the grid containing node $X_6$.

Figure 16:
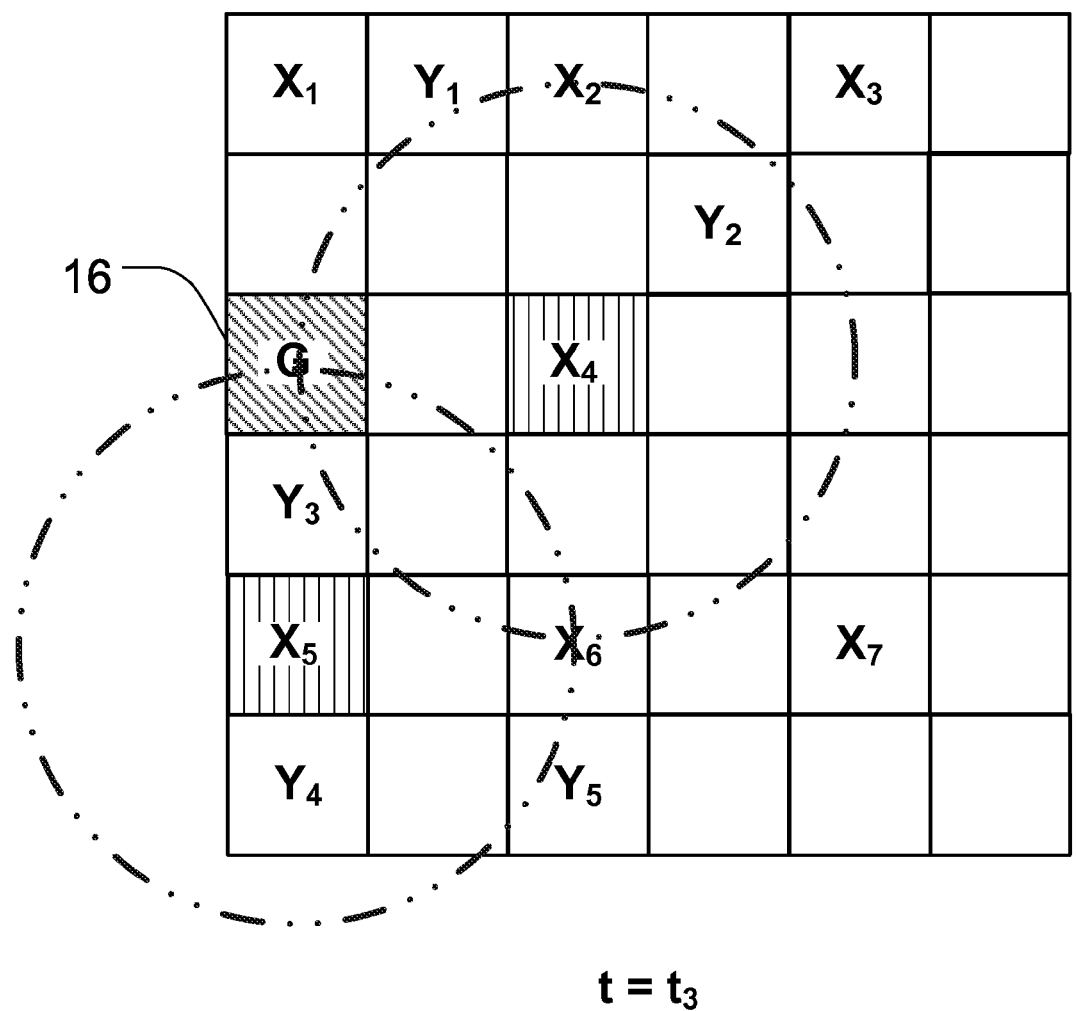

At time $t=t_3$, the message is shown in FIG. 16 being communicated by each of nodes $X_4,X_5$ to respective neighboring nodes that happen to be within communications range. The communications range of node $X_4$ is graphically illustrated by the generally circular outline around node $X_4$ in FIG. 16, and the communications range of node $X_5$ is graphically illustrated by the generally circular outline around node $X_5$ in FIG. 16. As further identified in FIG. 16, nodes $X_2,G,X_6$ each at least partially lies within the communications range of node $X_4$, and nodes $G,X_6$ each at least partially lies within the communications range of node $X_5$. The act of communicating the message by node $X_4$ further is graphically illustrated in FIG. 16 by shading of the square of the grid containing node $X_4$, and the act of communicating the message by node $X_5$ further is graphically illustrated in FIG. 16 by shading of the square of the grid containing node $X_5$. Receipt of a communication containing the message by node G at time $t=t_3$ also is emphasized in FIG. 16 by shading of the square of the grid containing node G.

Furthermore, it should be noted that node $X_7$ that receives the communication from node $X_6$ does not again communicate the message. Preferably, a message that has been communicated from a node is stored or cached within memory of the data communication device of the node, and before a message received from another node is forwarded, the message is screened against those messages stored or cached within memory. Alternatively, a message ID of a message that has been communicated from a node preferably is stored or cached within memory of the data communication device of the node, and before a message received from another node is forwarded, the message ID of that message is screened against the message IDs stored or cached within memory. In either case, if it is determined that a message previously has been communicated from the node, then the same message will not be communicated again from the node. Consequently, node $X_7$ is not illustrated in FIG. 16 as communicating the message again. Only nodes $X_4,X_5$, which have not yet communicated the message, are shown in FIG. 16 as communicating the message.

Figure 17:
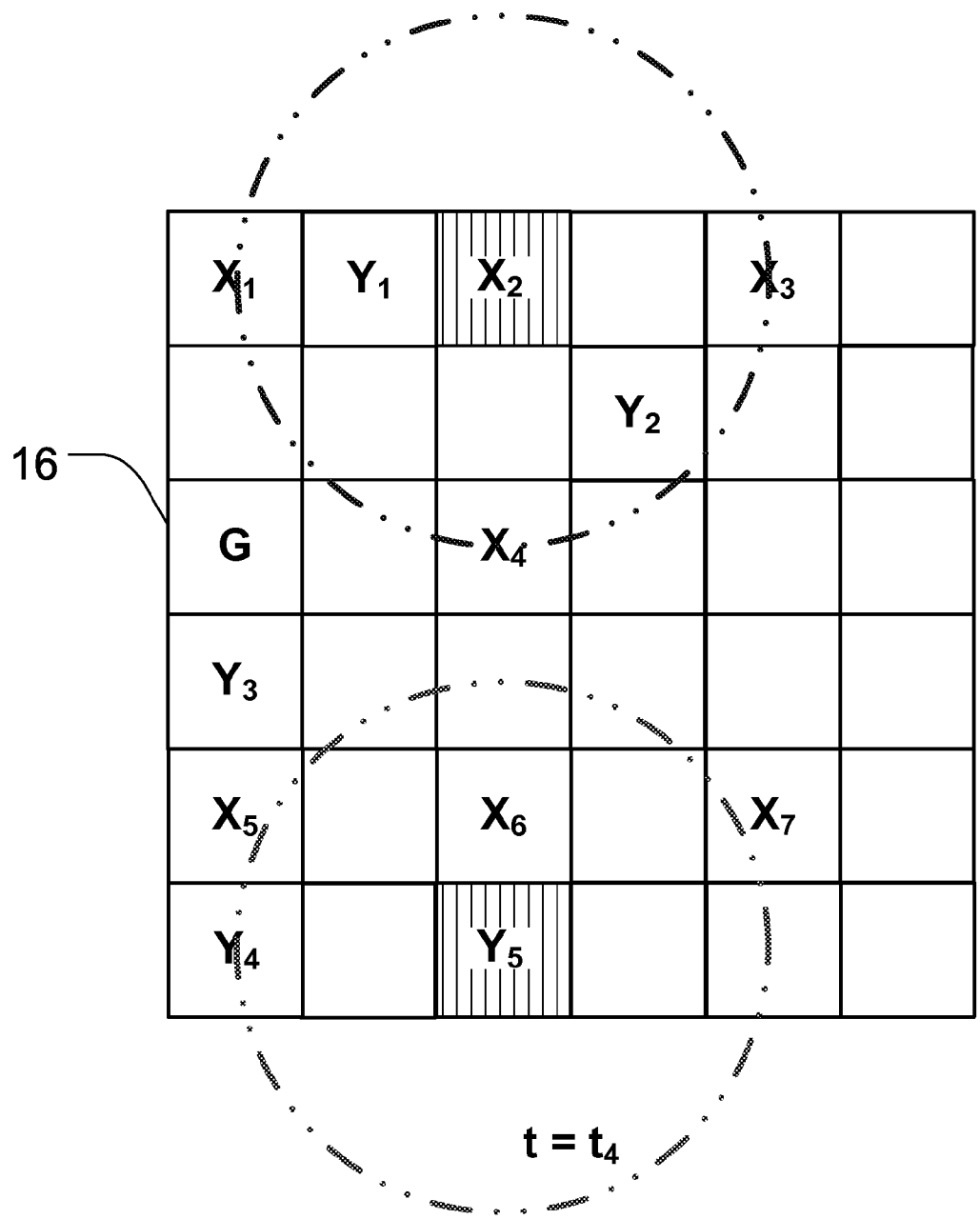

At time $t=t_4$, the message is shown in FIG. 17 being communicated to neighboring nodes $X_1,X_3,X_4$, which nodes happen to be within the communications range of node $X_2$. The communications range of node $X_2$ is graphically illustrated in FIG. 17 by the generally circular outline around node $X_2$, within which only nodes $X_1, X_3, X_4$ each at least partially lies. The act of communicating the message by node $X_2$ further is graphically illustrated by shading of the square of the grid containing node $X_2$.

Figure 18:
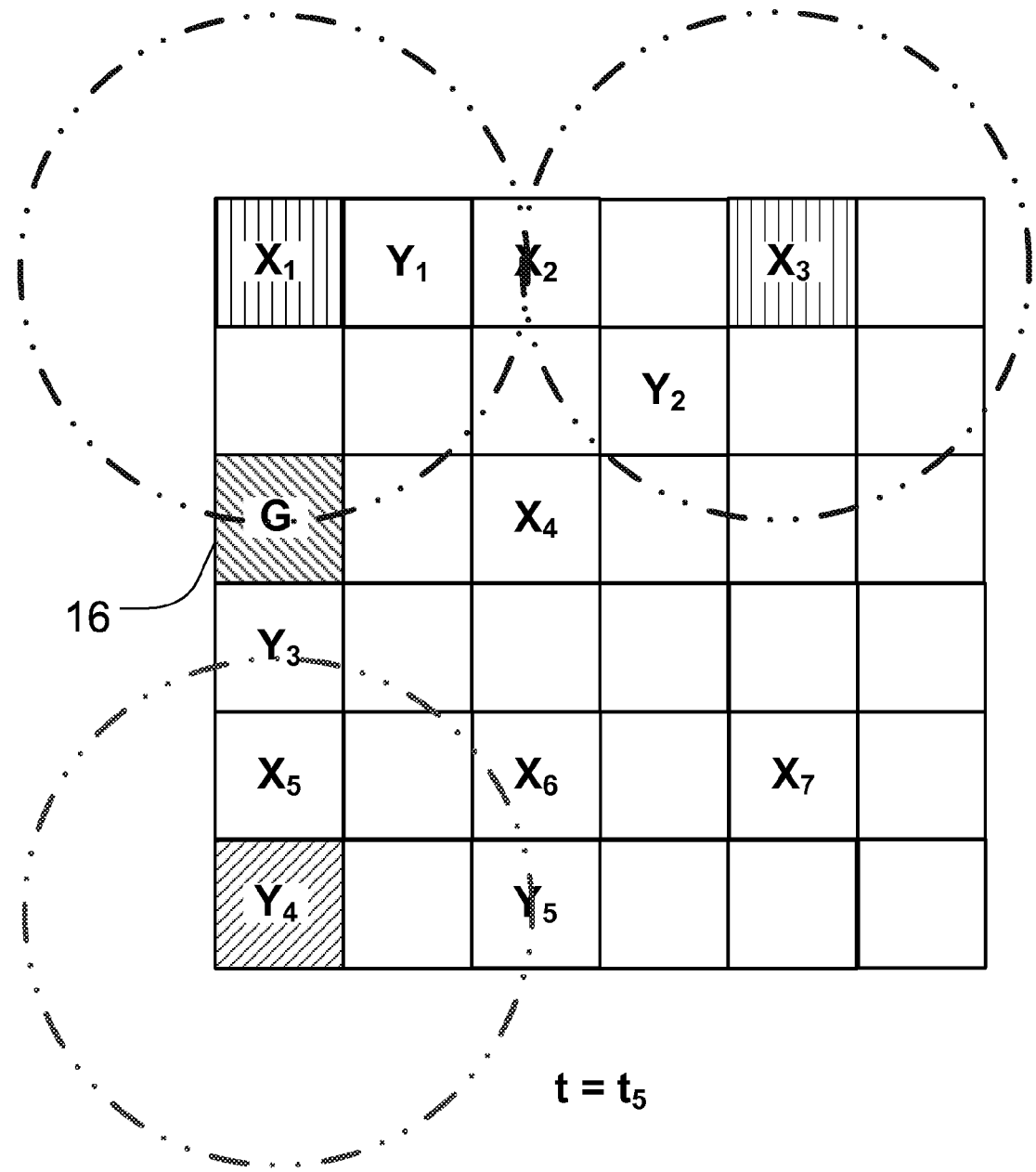

At time $t=t_5$, the message is shown in FIG. 18 being communicated by each of nodes $X_1, X_3$ to respective neighboring nodes that happen to be within communications range. The communications range of node $X_1$ is graphically illustrated by the generally circular outline around node $X_1$ in FIG. 18, and the communications range of node $X_3$ is graphically illustrated by the generally circular outline around node $X_3$ in FIG. 18. As further shown in FIG. 18, nodes $G, X_2$ each at least partially lies within the communications range of node $X_1$, and node $X_2$ at least partially lies within the communications range of node $X_3$. The act of communicating the message by node $X_1$ further is graphically illustrated by shading of the square of the grid containing node $X_1$, and the act of communicating the message by node $X_3$ further is graphically illustrated by shading of the square of the grid containing node $X_3$. Receipt of a communication containing the message by node G at time $t=t_5$ also is emphasized in FIG. 18 by shading of the square of the grid containing node G.

Figure 19:
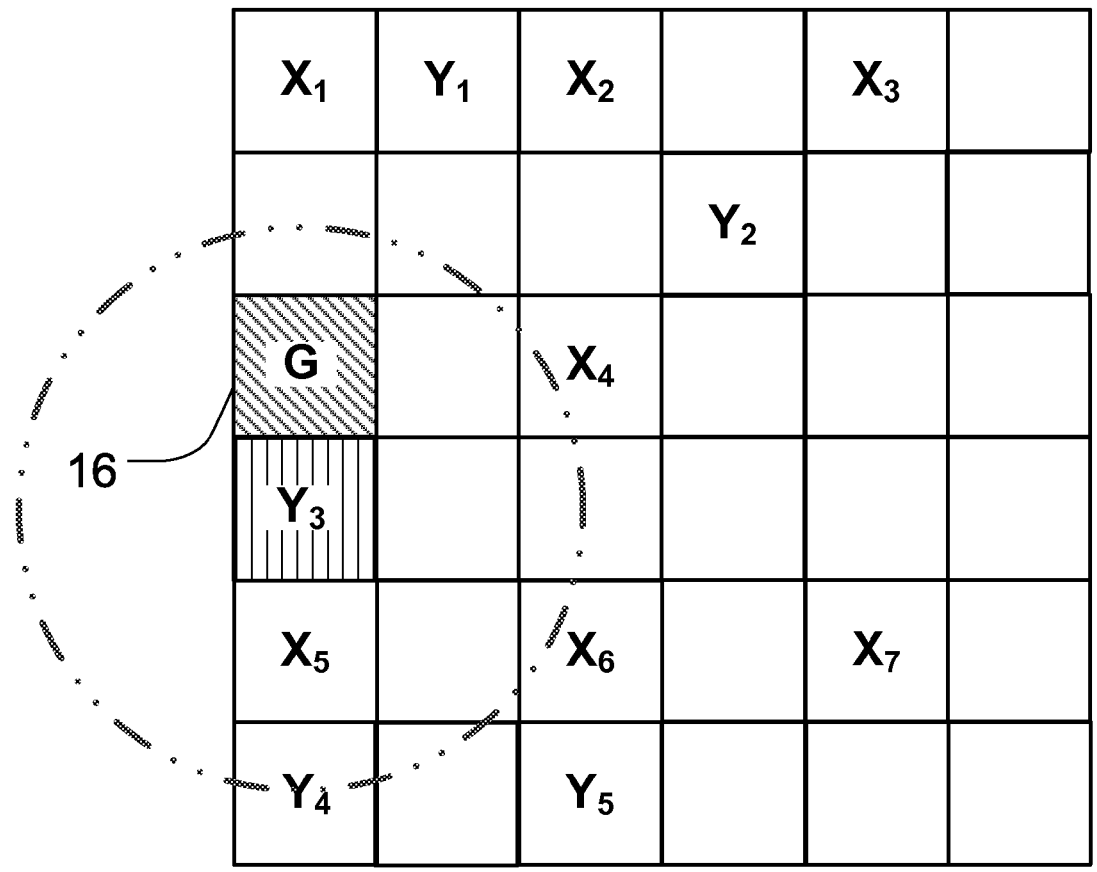

At time $t=t_6$, the message now has been communicated to the gateway 16 by way of three different pathways, the message has been propagated to all nodes of the "X" class-based wireless network, and no further communication of the message within the "X" class-based wireless network occurs, as illustrated in FIG. 19.

In accordance with preferred implementations, when node G (the gateway 16) receives the message intended for the server 10, the message is communicated to the server 10. Together with the message, the following information also preferably is communicated from the gateway 16 to the server 10: the pathway, including the identification of the originating node and each intermediate node by which the message was communicated; and the link quality of each communications link of the pathway. Other information also may be communicated, as desired.

Based on the illustration set forth in FIGS. 14-19, the server 10 will receive three communications of the message from the gateway 16. In accordance with the present invention, the server 10 will record, for each receipt of the message, the pathway by which the message was communicated, including the identification of the originating node and each intermediate node by which the message was communicated. The server 10 additionally will record the link quality of each communications link in the pathway and will calculate a representative overall link quality for each pathway. Any other information communicated with the message also may be recorded in association therewith. For instance, the server 10 will receive and record the link quality for all possible links in the "X" class-based network except the communications link between respective data communication devices of node $X_2$ and node $X_3$; this communications link will not be identified by the server 10 because no pathway included node $X_3$.

A subset of FIGS. 14-19—namely, FIGS. 17-19—illustrate nondeterministic networking in the "Y" class-based wireless network of FIG. 13. In this case, the sequence of node-to-node communications illustrated takes place following occurrence of a Trigger Event at node $Y_5$.

In particular, because of the occurrence of the Trigger Event at node $Y_5$, a message is originated and communicated from node $Y_5$ for further communication to the server 10. The sequence of node-to-node communications illustrated here is in accordance with nondeterministic routing and may occur, for example, when nodes $Y_1$ through $Y_5$ have not previously communicated with the server 10 through the wireless network, i.e., when each node may be "new" to the "Y" class-based wireless network and/or "new" to the wireless network topology thereof shown in FIG. 13.

With particular regard to certain steps in the sequence of communicating the message from node $Y_5$ to the gateway 16, FIG. 17 illustrates the wireless network 24 at time $t=t_4$ when a Trigger Event has occurred at node $Y_5$ and a message as been originated at node $Y_5$. At this time the pathway for reaching a gateway 16 in the "Y" class-based wireless network is unknown to the data communication device of node $Y_5$. Accordingly, the message is communicated generally to all data communication devices of class "Y" falling within the communications range of node $Y_5$. The message therefore is shown in FIG. 17 being communicated at time $t=t_4$ to neighboring node $Y_4$, which node happens to be within the communications range of node $Y_5$. Indeed, the communications range of node $Y_5$ is graphically illustrated in FIG. 17 by the generally circular outline around node $Y_5$, within which only node $Y_4$ of the "Y" class-based network at least partially lies. The act of communicating the message by node $Y_5$ further is graphically illustrated in FIG. 17 by shading of the square of the grid containing node $Y_5$.

Furthermore, it will be appreciated from the foregoing description that in communicating the message from node $Y_5$ to node $Y_4$, a communications link first was established between these two nodes. In establishing the communications link, preferably each node is identified to the other node, whereby the originating node will come to learn the neighboring node that falls within its communications range (at least at that time). Furthermore, node $Y_4$—an intermediate node—will come to learn from which node the message is received for forwarding to a gateway 16. In establishing the communications link and in communicating the message, information regarding the quality of the link also is monitored and recorded.

At time $t=t_5$, the message is shown in FIG. 18 being communicated by node $Y_4$ to neighboring nodes $Y_3, Y_5$, which nodes happen to be within the communications range of node $Y_4$ in the "Y" class-based wireless network. Again, because node $Y_4$ does not know a pathway to the gateway 16, node $Y_4$ proceeds to communicate the message generally to all nodes of the "Y" class-based network within its communications range following the same protocol as originating node $Y_5$. The communications range of node $Y_4$ is graphically illustrated in FIG. 18 by the generally circular outline around node $Y_4$, within which only nodes $Y_3, Y_5$ each at least partially lies. The act of communicating the message by node $Y_4$ further is graphically illustrated in FIG. 18 by shading of the square of the grid containing node $Y_4$.

At time $t=t_6$, the message is shown in FIG. 19 being communicated by node $Y_3$ in propagation of the message. The act of communicating the message by node $Y_3$ is graphically illustrated by shading of the square of the grid containing node $Y_3$. Furthermore, it should be noted that node $Y_5$, which received the communication from node $Y_4$, does not communicate the message a second time. Preferably, a message that has been communicated from a node is stored or cached within memory of the data communication device of the node, and before a message received from another node is forwarded, the message is screened against those messages stored or cached within memory. Alternatively, a message ID of a message that has been communicated from a node preferably is stored or cached within memory of the data communication device of the node, and before a message received from another node is forwarded, the message ID of that message is screened against the message IDs stored or cached within memory. In either case, if it is determined that a message previously has been communicated from the node, then the same message will not be communicated again from the node. Consequently, node $Y_5$ is not illustrated in FIG. 19 as communicating the message again. Only node $Y_3$, which has not yet communicated the message, is shown in FIG. 19 as communicating the message.

As further shown in FIG. 19, node G at least partially lies within the communications range of node $Y_3$. Receipt of the communication containing the message by node G at time $t=t_6$ is emphasized in FIG. 19 by shading of the square of the grid containing node G.

Moreover, because node G was the only node of the "Y" class-based network within the communication range of node $Y_3$, no further communication of the message within the "Y" class-based wireless network occurs.

In accordance with preferred implementations, when node G (the gateway 16) receives the message intended for the server 10, the message is communicated to the server 10. Together with the message, the following information also preferably is communicated from the gateway 16 to the server 10: the pathway, including the identification of the originating node and each intermediate node by which the message was communicated; and the link quality of each communications link of the pathway. Other information also may be communicated, as desired.

Based on the illustration set forth in FIGS. 17-19, the server 10 will receive a communication of the message from node $Y_5$ through the "Y" class-based network via the gateway 16. In accordance with the present invention, the server 10 will record the pathway by which the message was communicated, including the identification of the originating node and each intermediate node by which the message was communicated. The server 10 additionally will record the link quality of each communications link in the pathway and will calculate a representative overall link quality for the pathway. Any other information communicated with the message also may be recorded in association therewith.

Acknowledging Successful Receipt of a Message: Sending an ACK Via Deterministic Routing in Class-Based Networks Upon the successful receipt of a message by the server 10, the server 10 preferably sends to the originating node of the message an ACK to acknowledge the successful receipt of the message. Preferably, only one ACK is sent for each particular message, regardless of the number of times that the particular message is received by the server 10 via different pathways.

In sending the ACK, the server 10 preferably selects a known pathway based on information that is received with the message or that has been received in conjunction with previous messages or other intelligence that is known about the network topology. Selection of the particular pathway is made in accordance with one of the disclosed algorithms or in accordance with some other algorithm, as desired. If an ACK is not received from the server 10 by the originating node, then the originating node will save the message in memory for communication at a later time when communication with the server 10 is available.

Similarly, the receipt of a message representing a command or inquiry that is sent by a server 10 to a destination node preferably is acknowledged by an ACK being sent to the server 10 from the destination node. The message may be sent via a known pathway or, if the pathway is outdated or otherwise unknown, then the message is sent in accordance with the nondeterministic routing method of the present invention. In particular, the message is communicated to the wireless network in which the destination node is likely to be found. The message then propagates through the nodes of that wireless network and, when the destination node receives the message, the ACK is communicated by the destination node to the server 10. Moreover, like the server 10, the node in this case will have sufficient information upon receipt of the message to select the "best" pathway for communicating the ACK back to the server 10. Additionally, if an ACK is not received by the server 10, then the server 10 can store or cache the message for later communication, or the server 10 can communicate the message to one or more other suspected wireless networks in which the data communication device of the destination node (the actual recipient of the message) may be found.

Figure 20:
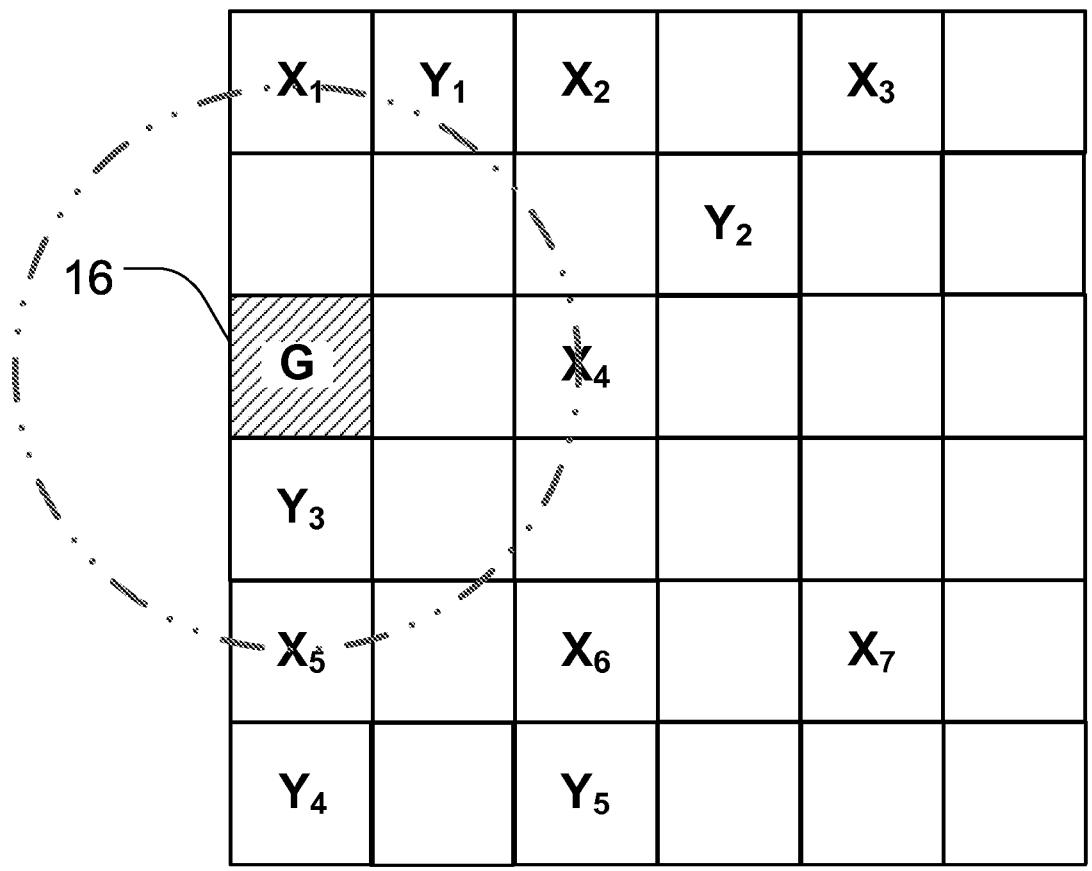
Figure 21:
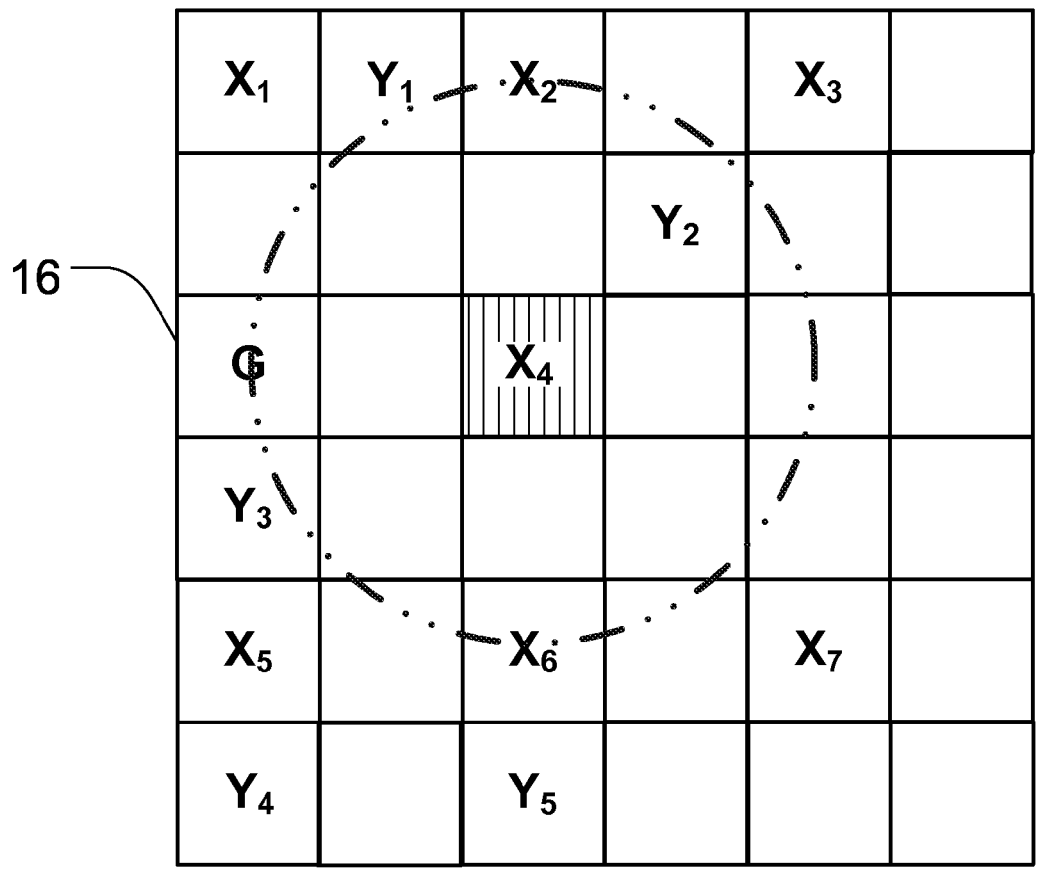
Figure 22:
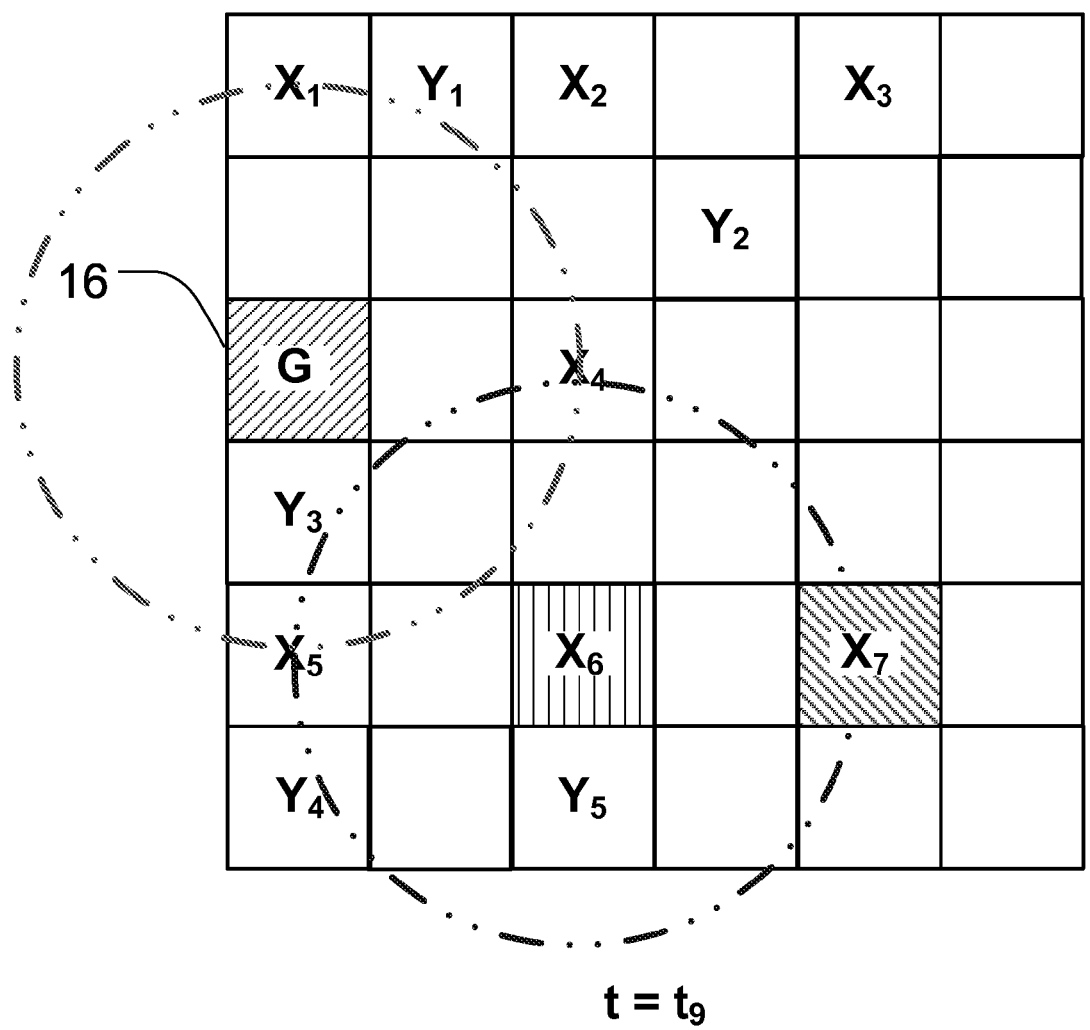
Figure 23:
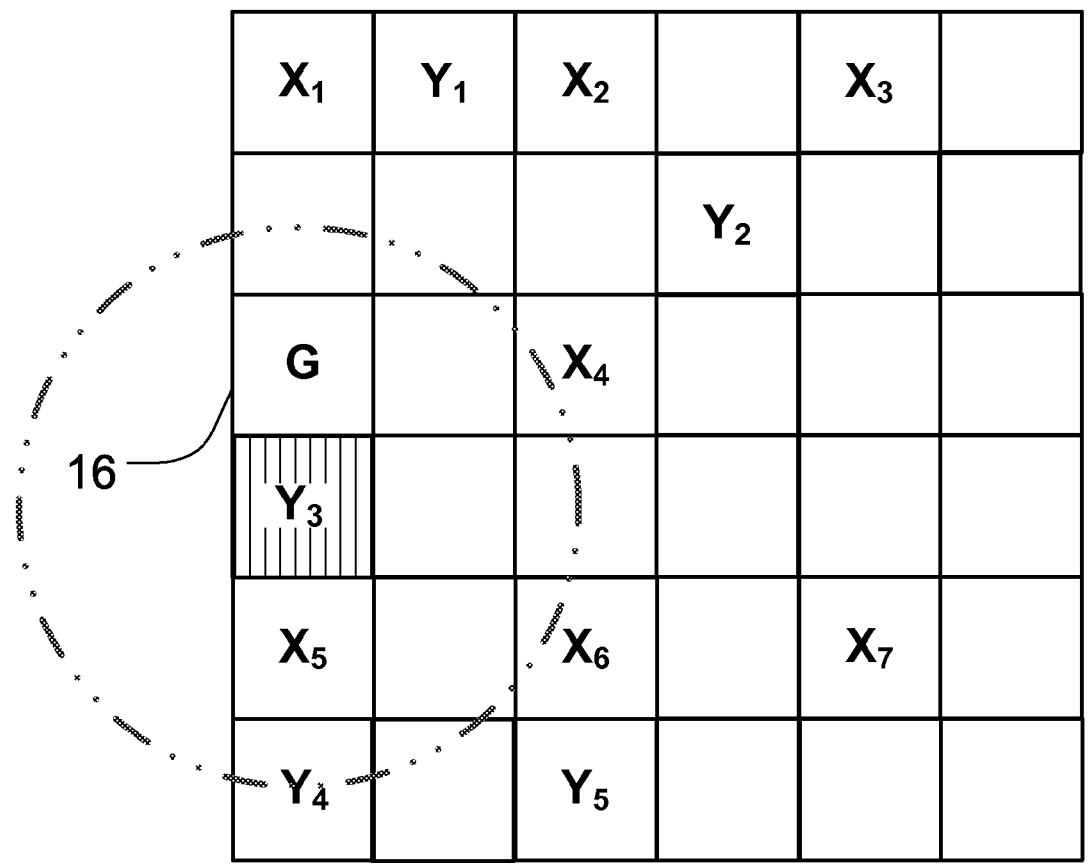
Figure 24:
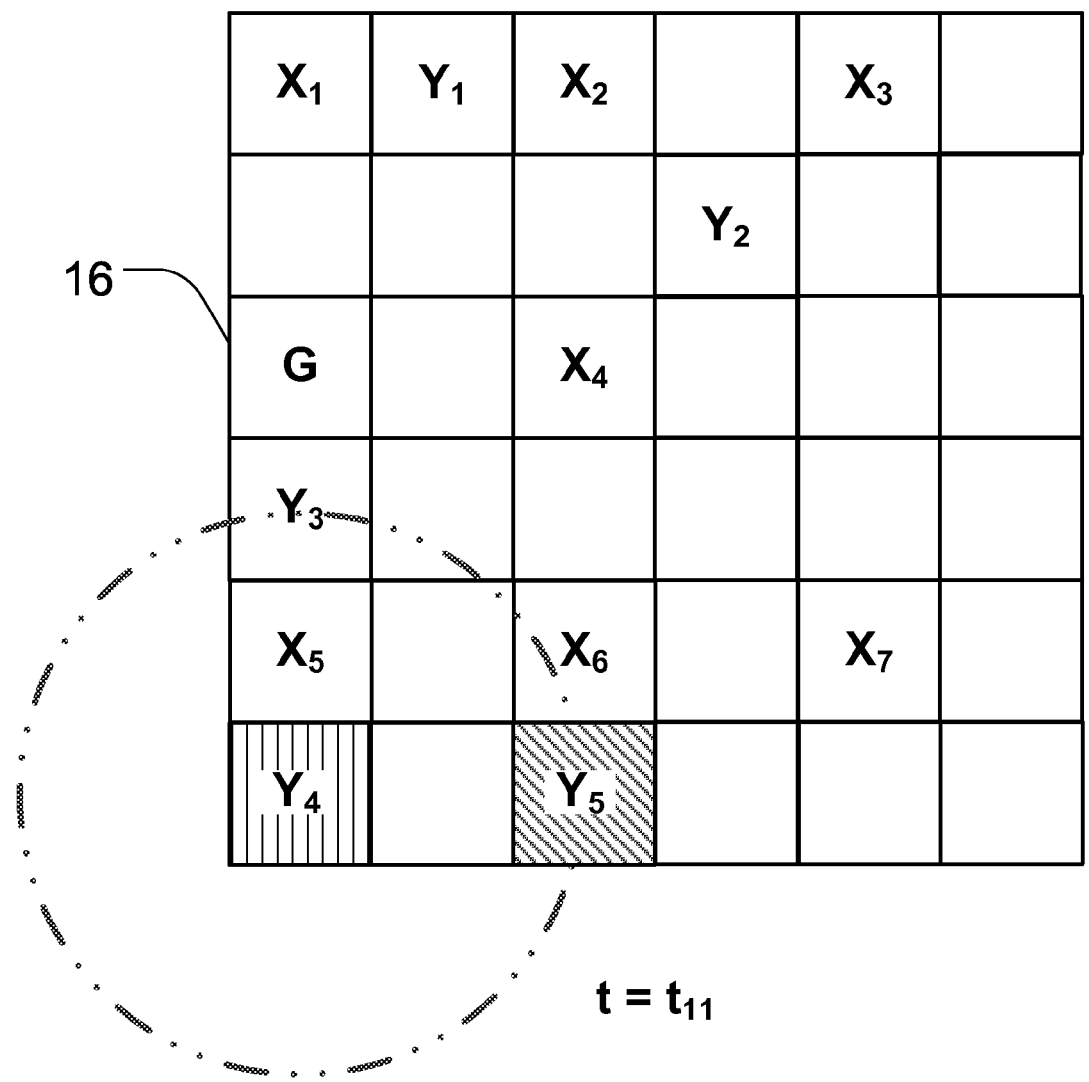

FIGS. 20-22 illustrate communication of an ACK from the server 10 to originating node $X_7$ of FIG. 14 along a deterministic route, and FIGS. 22-24 illustrate communication of an ACK from the server 10 to originating node $Y_5$ of FIG. 17 along a deterministic route. The deterministic route in each class-based wireless network is readily based on the information obtained from the nondeterministic routing illustration of FIGS. 14-19 and the information that is acquired by the server 10 in conjunction with the receipt of the message. Additionally, as will be appreciated, the information also may permit the server 10 to send a command or inquiry to any intermediate node via a deterministic route.

Server Search for Specific Node: Using all Available Resources of the Overall Wireless Network One of many advantages of the present invention utilized in class-based wireless networks is the ability to send communications via data communication devices of a particular class-based network without consuming power resources of data communication devices of one or more other class-based networks. This is particularly beneficial if two different class-based networks having nodes within communication range of each other are owned or operated by or on the behalf of separate legal entities.

Nevertheless, it also is beneficial to be able to utilize all nodes within communications range of another node regardless of particular classes of the nodes. For example, an urgent need may arise to communicate with a particular mobile data communications device that may be out of range of a node of a class with which that data communications device is associated, but nevertheless within range of a node of a different class-based wireless network.

An example of this scenario is illustrated in FIGS. 25-30 where node $Y_2$ is within communications range of nodes of the "X" class-based wireless network, but out of communications range of all other nodes of the "Y" class-based wireless network. If the server 10 has reason to suspect that the data communications device associated with node $Y_2$ is within the overall wireless network 24 of FIG. 13, then the server 10 may send a communication to node $Y_2$ via nondeterministic routing utilizing all nodes of the overall wireless network 24. In this case, the overall wireless network 24 is identified by the "A" class-based wireless network, of which all nodes (i.e., data communication devices) are members.

Figure 25:
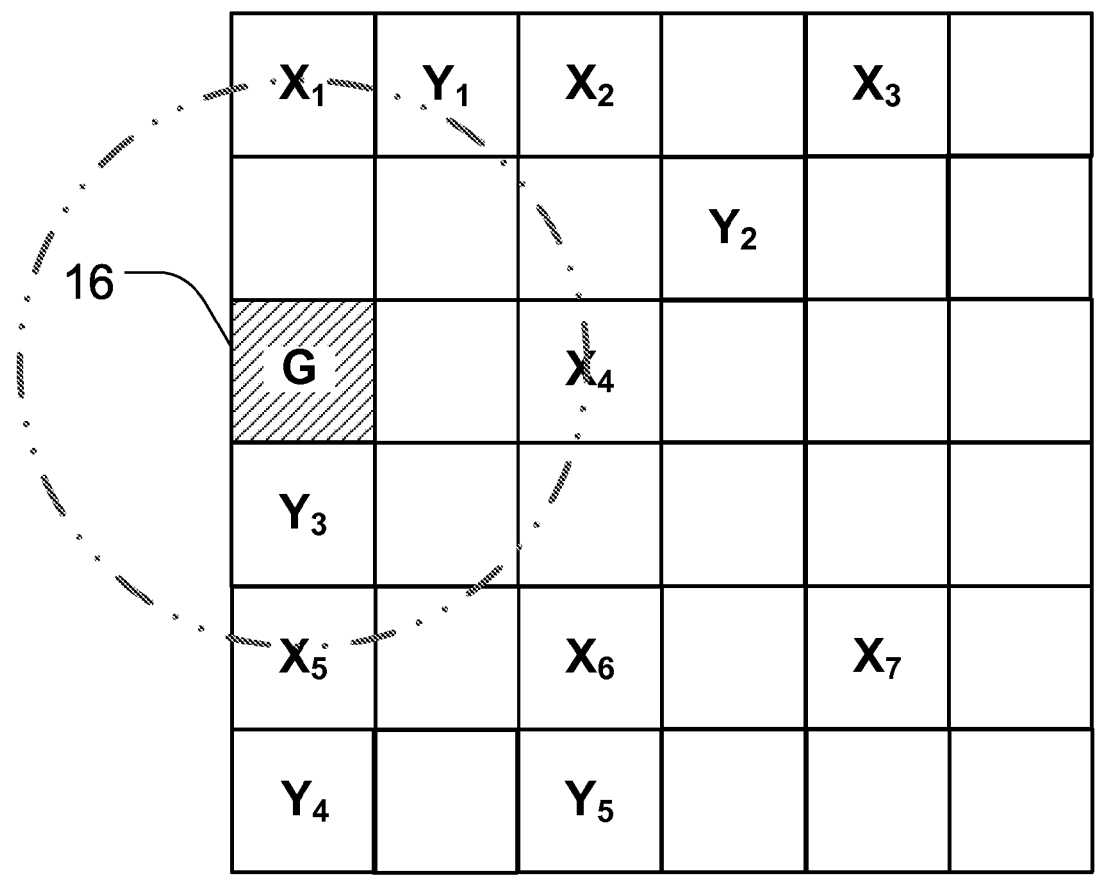

The server 10 thus sends a communication destined for receipt by node $Y_2$ via node G to the "A" class-based network. Transmission of this message by node G at time $t=t_{12}$ is illustrated in FIG. 25. Nodes $X_1,X_4,X_5,Y_3$ all are within the communications range of node G and, therefore, receive the message. Because each of these nodes $X_1,X_4,X_5,Y_3$ are members of the "A" class-based network, each node $X_1,X_4,X_5,Y_3$ (i.e., data communications device thereof) will receive the message and transmit the message intended for receipt by $Y_2$.

Figure 26:
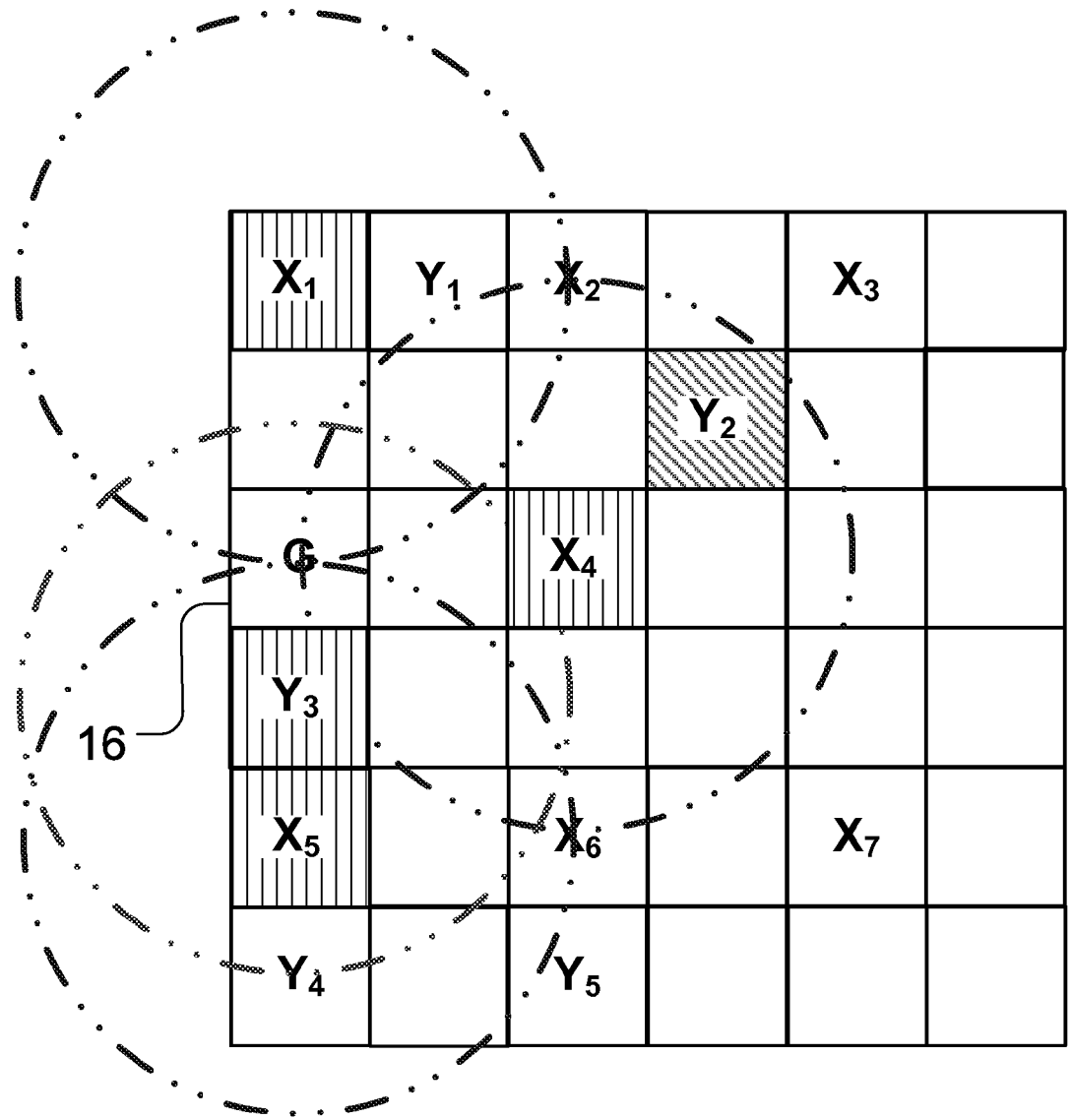

Assuming that none of the nodes $X_1,X_4,X_5,Y_3$ have information identifying a deterministic pathway to node $Y_2$, each preferably will transmit the message generally to all nodes of class "A" within its respective communications range for propagation of the message. This retransmission of the message by nodes $X_1,X_4,X_5,Y_3$ is illustrated in FIG. 26 at time t $t_{13}$. On the other hand, if a node $X_1,X_4,X_5,Y_3$ has information identifying a deterministic pathway to node $Y_2$, then that node preferably will transmit the message to node $Y_2$ via such deterministic network pathway.

Figure 27:
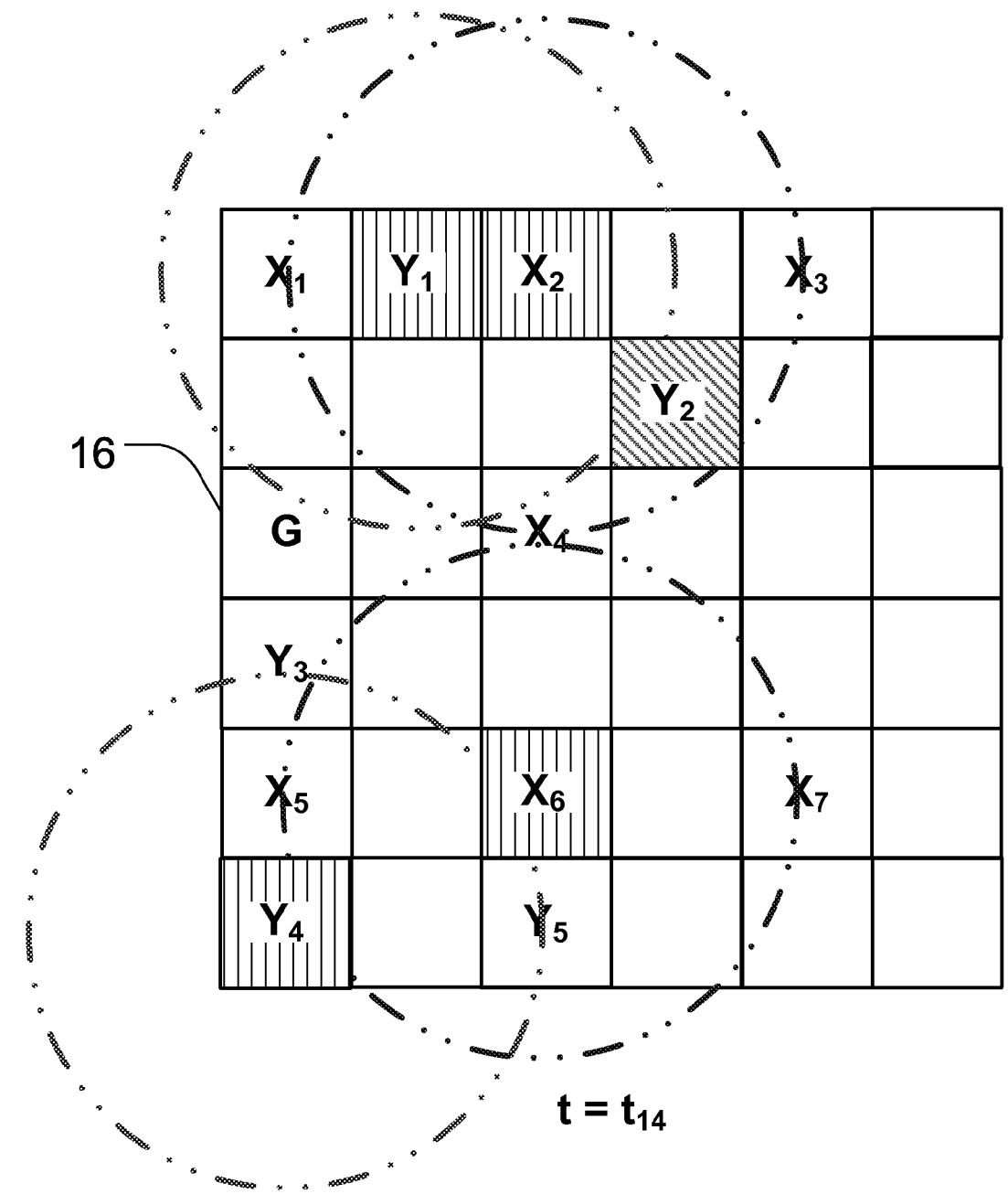
Figure 28:
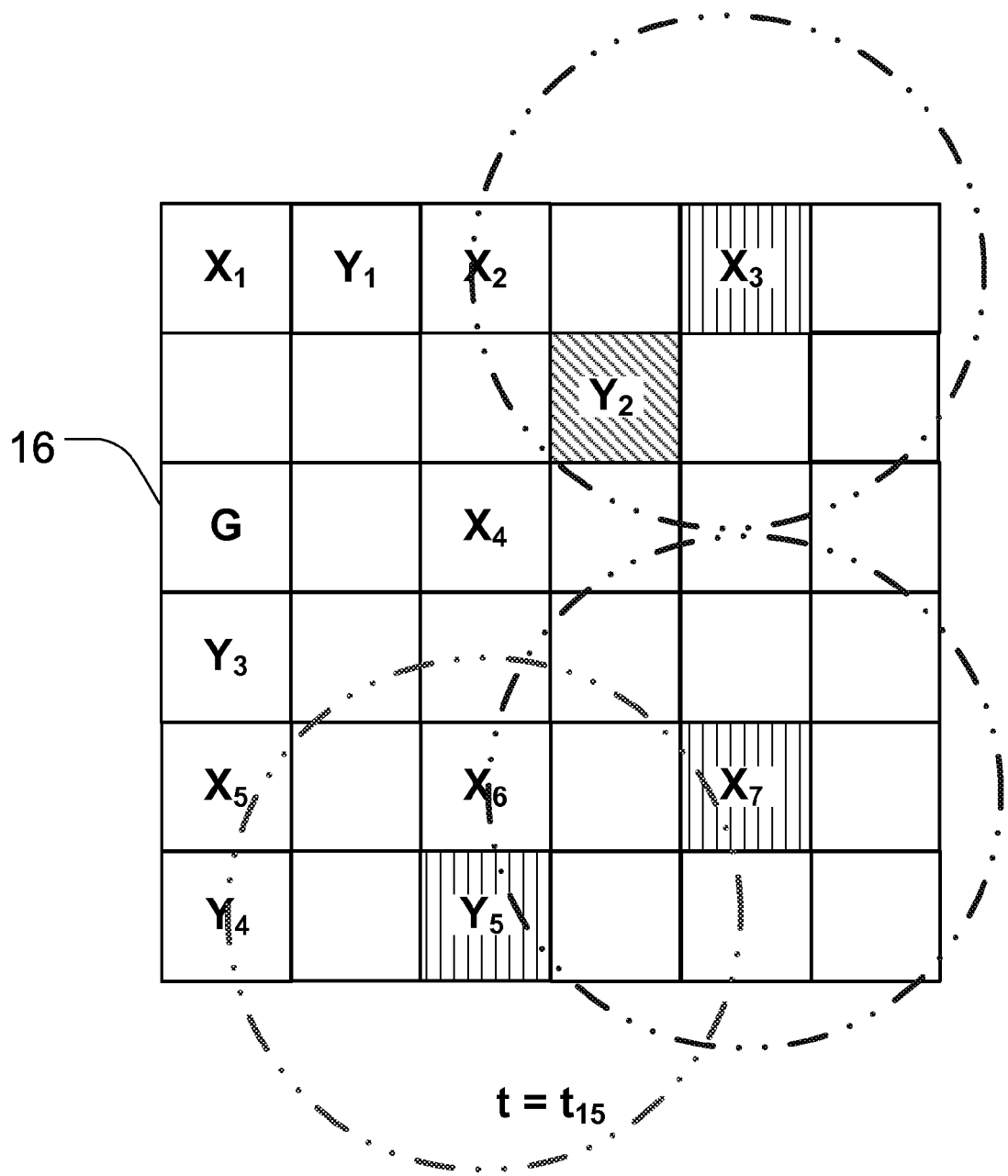

As shown in FIG. 26, node $Y_2$ is within communications range of node $X_4$ and first receives the message from the server 10 via intermediate node $X_4$. As the message continues to propagate, node $Y_2$ also receives the message from the server 10 via intermediate node $X_2$ as shown in FIG. 27 at time $t=t_{14}$; and receives the message from the server 10 via intermediate node $X_3$ as shown in FIG. 28 at time $t=t_{15}$. The data communications device of node $Y_2$ acknowledges receipt of the message from the server 10 by sending an ACK to the server 10, as illustrated in FIGS. 29-30.

Moreover, as will be appreciated, the message has been received three times and, hence, several pathways to the server 10 and information regarding those pathways are known to the data communications device of node $Y_2$.

Accordingly, a deterministic route is chosen based on an appropriate algorithm for sending the ACK to the server 10. The appropriate algorithm may take into account factors such as, for example, the number of intermediate nodes of the pathway, the link quality of the various communications links of the pathway, the overall link quality of the pathway, the number of "Y" class-based network nodes of the pathway, and the number of non "Y" class-based network nodes of the pathway.

Figure 29:
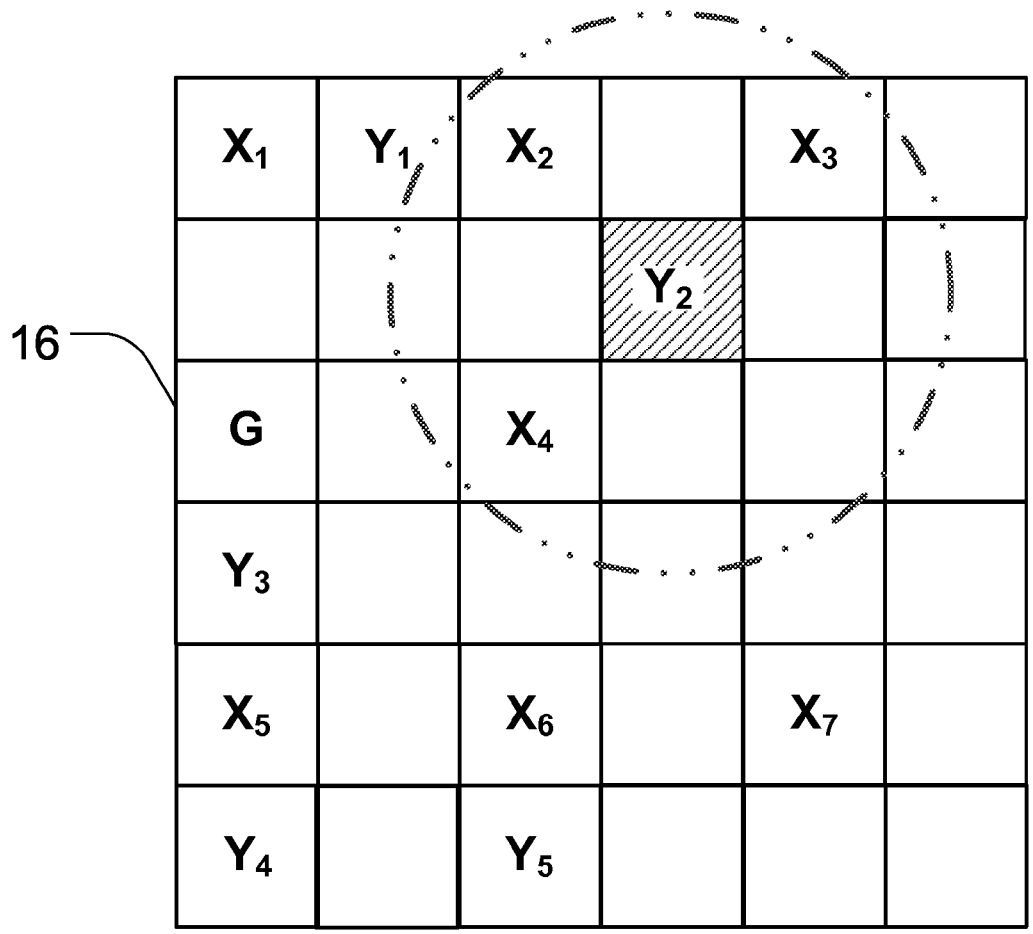
Figure 30:
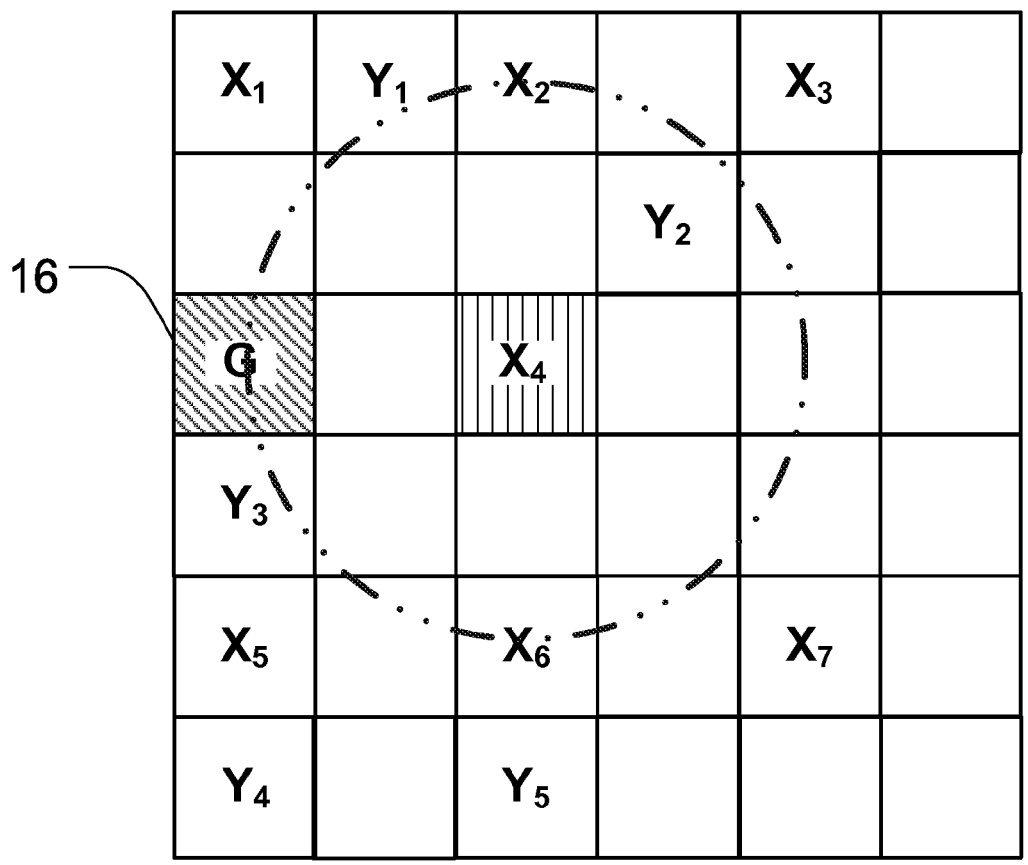

In this example, node $Y_2$ transmits a message representing the ACK to the server 10 by transmitting the message to node $X_4$ as shown in FIG. 29 at time $t=t_{16}$ and, in turn, node $X_4$ transmits the message representing the ACK to the node G as shown in FIG. 30 at time $t=t_{17}$. Node G further is shown as receiving this message in FIG. 30. It also should be noted that the ACK is transmitted in this case to an "X" class-based network node because node $Y_2$ otherwise would be out of communications range with the server 10 via node G and, therefore, unable to transmit the ACK successfully to the server 10 via node G.

Class Tables

In accordance with class-based networks, each data communications device of a node of a class-based wireless network preferably maintains membership information in the form of a membership table of the classes of which that device is a member. Furthermore, membership in a class need not be exclusive relative to membership in another class. For example, a particular communications device may include membership in both the "X" class and the "Y" class of the exemplary network 24 of FIG. 13. The class table can be referenced when a class-based message is received by a data communications device to determine whether the message is applicable to the data communications device.

Class tables also are helpful to reference when attempting to send a message. In this respect, a class table may include not only identification of the classes of which a data communications device is a member, but also the identification of other classes with which the data communications device may need to communicate under certain scenarios. Such a class table similarly is useful for a server 10 when sending class-based communications.

Additionally, in preferred embodiments, a server 10 maintains and updates class tables for various data communications devices of one or more class-based wireless networks, whereby centralized assignment of classes may be performed and distributed from the server 10 down to the different devices. Communications of updates and/or assignments of new classes for each data communications device thereby can be efficiently performed in accordance with such an architecture.

While the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention. It is not intended that the scope of patent protection afforded the present invention be defined by reading into any claim a limitation found herein that does not explicitly appear in the claim itself.

Alternative Embodiments

In alternative embodiments of the exemplary network architectures shown in FIGS. 1 and 13, it further is contemplated that the server 10 may be combined with a gateway 16, which combination sometimes may be referred to as a "gateway controller" or "GC". In such implementations the gateway controller performs both the aforementioned functions of the gateway 16 and the server 10. The WAN 12, if utilized in such alternative embodiments, then provides an avenue for communicating with the gateway controller for accessing information recorded and maintained by the gateway controller.

In yet further alternative embodiments, it is contemplated that, instead of "hopping" between nodes (which generally keeps power consumption low), continuous communications links can be established between nodes along a pathway between an originating node and a destination node. Maintaining the connection with continuous communications links facilitates large file transfers as well as real time communications, such as voice over IP and video conferencing communications between persons. Indeed, two communications links between each pair of nodes in the pathway may be established for enabling two-way communications using half-duplex standards based radios, such as Bluetooth radios.

What is claimed is:

1. In a wireless network comprising a plurality of nodes, a method of communicating a message from an originating node, intended for receipt by a destination node, via one or more intermediate nodes, comprising the steps of:
 (a) determining if a network pathway to the destination node is known by the originating node; and
 (b) communicating with just a single node within the communications range of the originating node if a network pathway to the destination node is known by the originating node, the single node being the first intermediate node identified in the known network pathway, said step of communicating including sending the message and the known network pathway to the first intermediate node;
 (c) communicating with one or more first intermediate nodes within the communications range of the originating node if a network pathway to the destination node is unknown by the originating node, said step of communicating including sending the message; and (d) communicating the message by each first intermediate node, wherein each first intermediate node is configured for
  (i) communicating with just a single node within the communications range of the first intermediate node if a single network pathway to the destination node is known by the first intermediate node, the single node being the node identified next after the first intermediate node in the single network pathway, including sending, to the single node,
    (A) the message,
    (B) the known network pathway, and
    (C) the link quality between the originating node and the first intermediate node,
  (ii) if a plurality of network pathways to the destination node are known by the first intermediate node, then,
    (A) determining a preferred network pathway from the plurality of known network pathways in accordance with an algorithm, and
    (B) communicating with just a single node within the communications range of the first intermediate node, the single node being the node identified next after the first intermediate node in the preferred network pathway, including sending, to the next identified node,
      (I) the message,
      (II) the preferred network pathway, and
      (III) the link quality between the originating node and the first intermediate node, and
  (iii) if no network pathway is known by the first intermediate node, then communicating with one or more nodes within the communications range of the first intermediate node, including sending,
    (A) the message, and
    (B) the link quality between the originating node and the first intermediate node.

2. The method of claim 1, wherein determining a preferred network pathway from the known network pathways in accordance with an algorithm comprises comparing, for each known network pathway, the number of hops, between nodes, that are required to reach the destination node.

3. The method of claim 1, wherein messages are communicated between nodes utilizing transmission control protocol (TCP).

4. The method of claim 1, wherein messages are communicated between nodes of the wireless network via data packets.

5. In a wireless network comprising a plurality of nodes, a method of communicating a message from an originating node, intended for receipt by a destination node, via one or more intermediate nodes, comprising the steps of:
  (a) determining if a network pathway to the destination node is known by the originating node; and
  (b) communicating with just a single node within the communications range of the originating node if a network pathway to the destination node is known by the originating node, the single node being the first intermediate node identified in the known network pathway, said step of communicating including sending the message and the known network pathway to the first intermediate node;
  (c) communicating with one or more first intermediate nodes within the communications range of the originating node if a network pathway to the destination node is unknown by the originating node, said step of communicating including sending the message; and
  (d) communicating the message by each first intermediate node, wherein each first intermediate node is configured for
    (i) communicating with just a single node within the communications range of the first intermediate node if a single network pathway to the destination node is known by the first intermediate node, the single node being the node identified next after the first intermediate node in the single network pathway, including sending, to the single node,
      (A) the message,
      (B) the known network pathway, and
      (C) the link quality between the originating node and the first intermediate node,
    (ii) if a plurality of network pathways to the destination node are known by the first intermediate node, then,
      (A) determining a preferred network pathway from the plurality of known network pathways in accordance with an algorithm, and
      (B) communicating with just a single node within the communications range of the first intermediate node, the single node being the node identified next after the first intermediate node in the preferred network pathway, including sending, to the next identified node,
        (I) the message,
        (II) the preferred network pathway, and
        (III) the link quality between the originating node and the first intermediate node, and
    (iii) if no network pathway is known by the first intermediate node, then communicating with one or more nodes within the communications range of the first intermediate node, including sending,
      (A) the message, and
      (B) the link quality between the originating node and the first intermediate node;
  (e) wherein determining a preferred network pathway from the known network pathways in accordance with an algorithm comprises comparing the overall link quality of the respective known network pathways.

6. The method of claim 5, wherein messages are communicated between nodes utilizing transmission control protocol (TCP).

7. The method of claim 5, wherein messages are communicated between nodes of the wireless network via data packets.

8. In a wireless network comprising a plurality of nodes, a method of communicating a message from an originating node, intended for receipt by a destination node, via one or more intermediate nodes, comprising the steps of:
  (a) first,
    (i) communicating with just a single node within the communications range of the originating node if a network pathway to the destination node is known by the originating node, the single node being the first intermediate node identified in the known network pathway, said step of communicating including sending the message and the known network pathway to the first intermediate node, or
    (ii) communicating with one or more first intermediate nodes within the communications range of the originating node if a network pathway to the destination node is unknown by the originating node, said step of communicating including sending the message; and (b) thereafter, further communicating the message by each first intermediate node by:
  (i) communicating with just a single node within the communications range of that first intermediate node if a single network pathway to the destination node is known by that first intermediate node, the single node being the node identified next after that first intermediate node in the single network pathway, including sending, to the single node,
    (A) the message, and
    (B) the known network pathway, and
  (ii) if a plurality of network pathways to the destination node are known by that first intermediate node, then,
    (A) determining a preferred network pathway from the plurality of known network pathways in accordance with an algorithm, and
    (B) communicating with just a single node within the communications range of that first intermediate node, the single node being the node identified next after that first intermediate node in the preferred network pathway, including sending, to the next identified node,
      (I) the message, and
      (II) the preferred network pathway, or
  (iii) by each first intermediate node, if no network pathway is known, then communicating with one or more nodes within the communications range of that first intermediate node, including sending the message;
(c) wherein the originating node is configured to
  (i) determine if a network pathway to the destination node is known,
  (ii) attempt to communicate with just a single node of a known network pathway if a network pathway is known, and
  (iii) attempt to communicate with one or more nodes within the communications range of the originating node if no network pathway to the destination node is known; and
(d) wherein each first intermediate node is configured to
  (i) determine if one or more network pathways to the destination node are known,
  (ii) attempt to communicate, if just a single network pathway to the destination node is known by that first intermediate node, with just a single node of that single known network pathway,
  (iii) determine, if a plurality of network pathways to the destination node are known by that first intermediate node, a preferred network pathway, and attempt to communicate with just a single node of such a determined preferred network pathway, and
  (iv) attempt to communicate, if no network pathway to the destination node is known by that first intermediate node, with one or more nodes within the communications range of that first intermediate node.

9. The method of claim 8, wherein the determining of a preferred network pathway from the known network pathways in accordance with an algorithm comprises both (a) comparing, for each known network pathway, the number of hops, between nodes, that are required to reach the destination node, and (b) comparing the overall link quality of the respective known network pathways.

* * * * *